(12) United States Patent
Evans et al.

(10) Patent No.: US 9,772,848 B2
(45) Date of Patent: *Sep. 26, 2017

(54) THREE-DIMENSIONAL MORTON COORDINATE CONVERSION PROCESSORS, METHODS, SYSTEMS, AND INSTRUCTIONS

(71) Applicant: Intel Corporation, Santa Clara, CA (US)

(72) Inventors: Arnold Kerry Evans, Chandler, AZ (US); Elmoustapha Ould-Ahmed-Vall, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 234 days.

This patent is subject to a terminal disclaimer.

(21) Appl. No.: 14/541,855

(22) Filed: Nov. 14, 2014

(65) Prior Publication Data

US 2016/0139929 A1    May 19, 2016

(51) Int. Cl.
*G06F 9/30* (2006.01)

(52) U.S. Cl.
CPC ...... *G06F 9/30196* (2013.01); *G06F 9/30025* (2013.01); *G06F 9/30036* (2013.01); *G06F 9/30145* (2013.01)

(58) Field of Classification Search
None
See application file for complete search history.

(56) References Cited

U.S. PATENT DOCUMENTS

| 5,594,844 A | 1/1997 | Sakai et al. |
| 5,650,862 A | 7/1997 | Shimizu et al. |
| 5,986,604 A | 11/1999 | Nichols et al. |

(Continued)

FOREIGN PATENT DOCUMENTS

| TW | 486618 B | 5/2002 |
| TW | 200739377 A | 10/2007 |

(Continued)

OTHER PUBLICATIONS

Non Final Office Action received for U.S. Appl. No. 14/542,502, mailed on Sep. 16, 2016, 22 pages.

(Continued)

*Primary Examiner* — Corey S Faherty
(74) *Attorney, Agent, or Firm* — Vecchia Patent Agent, LLC

(57) ABSTRACT

A processor includes a plurality of packed data registers, a decode unit, and an execution unit. The decode unit is to decode a three-dimensional (3D) Morton coordinate conversion instruction. The 3D Morton coordinate conversion instruction to indicate a source packed data operand that is to include a plurality of 3D Morton coordinates, and to indicate one or more destination storage locations. The execution unit is coupled with the packed data registers and the decode unit. The execution unit, in response to the decode unit decoding the 3D Morton coordinate conversion instruction, is to store one or more result packed data operands in the one or more destination storage locations. The one or more result packed data operands are to include a plurality of sets of three 3D coordinates. Each of the sets of the three 3D coordinates is to correspond to a different one of the 3D Morton coordinates.

24 Claims, 24 Drawing Sheets

(56) References Cited

U.S. PATENT DOCUMENTS

| | | | |
|---|---|---|---|
| 6,058,465 A | 5/2000 | Nguyen | |
| 6,182,203 B1 | 1/2001 | Simar, Jr. et al. | |
| 6,301,389 B1 | 10/2001 | Penna et al. | |
| 6,351,440 B1* | 2/2002 | Fukuda | G11B 7/0953 |
| | | | 369/47.36 |
| 6,745,319 B1 | 6/2004 | Balmer et al. | |
| 6,788,303 B2 | 9/2004 | Baldwin | |
| 6,920,446 B1 | 7/2005 | Wang et al. | |
| 6,957,408 B1* | 10/2005 | Teig | G06F 17/5077 |
| | | | 716/129 |
| 6,990,555 B2* | 1/2006 | Vorbach | G06F 12/0811 |
| | | | 711/122 |
| 7,145,480 B2 | 12/2006 | Ford et al. | |
| 7,197,625 B1 | 3/2007 | van Hook et al. | |
| 7,219,215 B2 | 5/2007 | Ford et al. | |
| 7,239,989 B2* | 7/2007 | Kothuri | G06F 17/30241 |
| | | | 703/13 |
| 7,327,572 B2 | 2/2008 | Erturk et al. | |
| 7,471,291 B2* | 12/2008 | Kaufman | G06T 15/06 |
| | | | 345/424 |
| 7,493,475 B2 | 2/2009 | Colavin | |
| 7,796,166 B2* | 9/2010 | Silverbrook | B41J 2/14314 |
| | | | 348/207.2 |
| 7,937,559 B1 | 5/2011 | Parameswar et al. | |
| 8,078,804 B2* | 12/2011 | Pappalardo | G06F 12/084 |
| | | | 711/118 |
| 8,219,564 B1 | 7/2012 | Shao et al. | |
| 8,281,108 B2* | 10/2012 | Vorbach | G06F 15/7867 |
| | | | 712/15 |
| 8,321,492 B1 | 11/2012 | Sengupta et al. | |
| 8,385,669 B2 | 2/2013 | Gerhard et al. | |
| 8,577,164 B2 | 11/2013 | Strom et al. | |
| 8,589,369 B2* | 11/2013 | Cha | G06F 17/30327 |
| | | | 707/705 |
| 8,700,661 B2 | 4/2014 | Pfeifle | |
| 8,773,422 B1* | 7/2014 | Garland | G06T 15/06 |
| | | | 345/418 |
| 8,780,112 B2 | 7/2014 | Kontkanen et al. | |
| 9,069,686 B2 | 6/2015 | Azadet et al. | |
| 2003/0043133 A1 | 3/2003 | Tzelnick | |
| 2006/0287984 A1 | 12/2006 | Chen et al. | |
| 2007/0146378 A1* | 6/2007 | Sorgard | G06T 15/00 |
| | | | 345/581 |
| 2009/0089540 A1 | 4/2009 | Hansen et al. | |
| 2009/0092315 A1 | 4/2009 | Strom | |
| 2009/0244074 A1 | 10/2009 | Montrym et al. | |
| 2009/0287702 A1 | 11/2009 | Pascucci | |
| 2010/0082654 A1 | 4/2010 | Zhang et al. | |
| 2010/0106944 A1 | 4/2010 | Symes et al. | |
| 2010/0146241 A1* | 6/2010 | Rakib | G06F 15/8007 |
| | | | 712/22 |
| 2010/0185692 A1 | 7/2010 | Zhang et al. | |
| 2011/0235928 A1* | 9/2011 | Strom | H04N 19/176 |
| | | | 382/233 |
| 2012/0105469 A1* | 5/2012 | Pascucci | G06T 3/40 |
| | | | 345/600 |
| 2012/0281006 A1 | 11/2012 | Nystad et al. | |
| 2012/0313944 A1 | 12/2012 | Kontkanen et al. | |
| 2013/0003868 A1 | 1/2013 | Sjoberg et al. | |
| 2013/0036290 A1 | 2/2013 | Nystad et al. | |
| 2013/0124835 A1 | 5/2013 | Peleg et al. | |
| 2013/0198485 A1 | 8/2013 | Nystad et al. | |
| 2013/0235050 A1 | 9/2013 | Karras | |
| 2013/0339411 A1 | 12/2013 | Bogosian | |
| 2014/0074904 A1 | 3/2014 | Givelberg et al. | |
| 2014/0181175 A1 | 6/2014 | Givelberg et al. | |
| 2014/0208069 A1 | 7/2014 | Wegener et al. | |
| 2015/0032684 A1* | 1/2015 | Gupta | G06F 17/30575 |
| | | | 707/600 |
| 2015/0062154 A1 | 3/2015 | Ellis et al. | |
| 2015/0130047 A1 | 5/2015 | Chun-Hao et al. | |
| 2015/0154772 A1 | 6/2015 | Hasselgren et al. | |
| 2015/0310047 A1* | 10/2015 | Zhou | G06F 17/30333 |
| | | | 707/737 |

FOREIGN PATENT DOCUMENTS

| | | |
|---|---|---|
| TW | 201224921 A | 6/2012 |
| TW | 201303482 A | 1/2013 |
| TW | 201316249 A | 4/2013 |
| TW | 201337740 A | 9/2013 |
| TW | 201415300 A | 4/2014 |
| TW | I450188 B | 8/2014 |
| TW | I450192 B | 8/2014 |
| TW | I455018 B | 10/2014 |
| WO | 91/20047 A1 | 12/1991 |
| WO | 2013/095521 A1 | 6/2013 |
| WO | 2016/077018 A1 | 5/2016 |
| WO | 2016/077019 A1 | 5/2016 |
| WO | 2016/077020 A1 | 5/2016 |
| WO | 2016/077335 A1 | 5/2016 |
| WO | 2016/077344 A1 | 5/2016 |
| WO | 2016/077351 A1 | 5/2016 |

OTHER PUBLICATIONS

International Search Report and Written Opinion received for PCT Patent Application No. PCT/US2015/059940, mailed on Feb. 24, 2016, 9 pages.

International Search Report and Written Opinion received for PCT Patent Application No. PCT/US2015/059953, mailed on Mar. 31, 2016, 10 pages.

Office Action & Search Report received for Taiwan Patent Application No. 104133040, mailed on Aug. 18, 2016, 7 pages of Taiwan Office Action including 4 pages of English Translation.

Evans, et al. "Machine Level Instructions to Compute a 3D Z-Curve Index from 3D Coordinates", U.S. Appl. No. 14/542,499, filed Nov. 14, 2014, 80 pages.

Evans, et al. "Machine Level Instructions to Compute a 4D Z-Curve Index from 4D Coordinates", U.S. Appl. No. 14/542,502, filed Nov. 14, 2014, 85 pages.

Evans, et al. "Morton Coordinate Adjustment Processors, Methods, Systems, and Instructions", U.S. Appl. No. 14/542,004, filed Nov. 14, 2014, 97 pages.

Evans,, et al. "Four-Dimensional Morton Coordinate Conversion Processors, Methods, Systems, and Instructions", U.S. Appl. No. 14/541,859, filed Nov. 14, 2014, 104 pages.

Evans, et al. "Vector Instruction to Compute Coordinate of Next Point in a Z-Order Curve", U.S. Appl. No. 14/542,457, filed Nov. 14, 2014, 82 pages.

Terry et al., "Indexing Method for Multidimensional Vector Data", Computer Science and Information Systems, vol. 10, No. 3, Jun. 2013, pp. 1077-1104.

International Search Report and Written Opinion Received for PCT Application No. PCT/US2015/055591, mailed on Feb. 23, 2016, 12 pages.

International Search Report and Written Opinion Received for PCT Application No. PCT/US2015/055592, mailed on Feb. 23, 2016, 12 pages.

International Search Report and Written Opinion received for PCT Application No. PCT/US2015/055593, mailed on Feb. 23, 2016, 12 pages.

International Search Report and Written Opinion received for PCT Application No. PCT/US2015/059961, mailed on Mar. 31 2016, 12 pages.

Raman et al., "Converting to and from Dilated Integers", IEEE Transactions on Computers, vol. C99, No. 13, Jul.-Oct. 2007, pp. 2-8.

Stocco et al., "On Spatial Orders and Location Codes", IEEE Transactions on Computers, vol. 58, No. 3, Mar. 2009, pp. 424-432.

Wise, David S., "Ahnentafel Indexing Into Morton-Ordered Arrays, or Matrix Locality for Free", Euro-Par 2000, Parallel Processing, 6th International Euro-Par Conference, Munich, Germany, Aug. 29-Sep. 1, 2000, pp. 774-783.

(56) References Cited

OTHER PUBLICATIONS

Morton, "Decoding Morton Codes", Dec. 13, 2009, 5 pages.
Chatterjee et al., "Cache-Efficient Matrix Transposition", Department of Computer Science, University of North Carolina, 2000, 13 pages.
Valsalam et al., "A Framework for High-Performance Matrix Multiplication Based on Hierarchical Abstractions, Algorithms and Optimized Low-Level Kernels", Jun. 2001, pp. 805-839.
Z-order curve—Wikipedia, the free encyclopedia, retrieved on Oct. 31, 2014, 7 pages. web page available at: http://en.wikipedia.org/wiki/Z-order_curve.
Notice of Allowance received for Taiwan Patent Application No. 104133040, mailed on Jan. 23, 2017, 2 pages of Taiwan Notice of Allowance.
Office Action received for Taiwan Patent Application No. 104133041, mailed on Nov. 29, 2016, 4 pages of English Translation and 5 pages of Taiwan Office Action.
Office Action and Search Report received for Taiwan Patent Application No. 104133042, mailed on Feb. 18, 2017, 8 pages of Taiwan Office Action including 4 pages of English Translation.
Office Action and Search Report received for Taiwan Patent Application No. 104133232, mailed on Mar. 20, 2017, 5 pages of English Translation and 4 pages of Taiwan Office Action.
Notice of Allowance received for Taiwan Patent Application No. 104133233, mailed on Mar. 20, 2017, 2 pages of Taiwan Notice of Allowance.
Non-Final Office Action received for U.S. Appl. No. 14/542,457, mailed on Mar. 9, 2017, 18 pages.
Non-Final Office Action received for U.S. Appl. No. 14/542,499, mailed on Mar. 23, 2017, 24 pages.
Final Office Action received for U.S. Appl. No. 14/542,502, mailed on Mar. 8, 2017, 21 pages.
Bader, Michael "An Introduction with Applications in Scientific Computing", Texts in computational science and engineering, Apr. 23, 2012, 286 Pages.
Chen et al., "Neighbor-Finding Based on Space-Filling Curves", Information Systems 30, 2005, pp. 205-226.
Karras, Tero, "Thinking Parallel, Part III: Tree Construction on the GPU", Parallel Forall, Dec. 19 2012, 8 Pages.
Hoedt, Asger, "Morton Codes", retrieved from <https://web.archive.org/web/20140724015036/http://asgerhoedt.dk/?p=276>, Oct. 19, 2012, 5 pages.
Baert's, Jeroen, "Morton encoding/decoding through bit interleaving: Implementations", retrieved from <https://web.archive.org/web/201407240%2015036/http://asg%20erhoedt.dkl?p=276>, Oct. 7, 2013, 13 Pages.
Office Action & Search Report received for Taiwan Patent Application No. 104133233, mailed on Nov. 22, 2016, 18 pages of Taiwan Office Action including 9 pages of English Translation.
Notice of Allowance and Search Report received for Taiwanese Patent Application No. 104133044, mailed on Sep. 23, 2016, 4 pages of Taiwanese Notice of Allowance including 1 page of English Translated Search Report.
Non Final Office Action received for U.S. Appl. No. 14/541,859, mailed on Nov. 21, 2016, 7 pages.
Non Final Office Action received for U.S. Appl. No. 14/542,004, mailed on Nov. 21, 2016, 5 pages.
International Preliminary Report on Patentability and Written Opinion received for PCT Patent Application No. PCT/US2015/055591, dated May 26, 2017, 8 pages.
International Preliminary Report on Patentability and Written Opinion received for PCT Patent Application No. PCT/US2015/055592, dated May 26, 2017, 8 pages.
International Preliminary Report on Patentability Report and Written Opinion Received for PCT Application No. PCT/US2015/055593, dated May 26, 2017, 8 pages.
International Preliminary Report on Patentability received for PCT Patent Application No. PCT/US2015/059940, dated May 26, 2017, 8 pages.
International Preliminary Report on Patentability received for PCT Patent Application No. PCT/US2015/059953, dated May 26, 2017, 9 pages.
International Preliminary Report on Patentability and Written Opinion received for PCT Patent Application No. PCT/US2015/059961, dated May 26, 2017, 9 pages.
Notice of Allowance received for U.S. Appl. No. 14/541,859, dated May 16, 2017, 8 pages.
Notice of Allowance received for U.S. Appl. No. 14/542,004, dated May 17, 2017, 8 pages.

\* cited by examiner

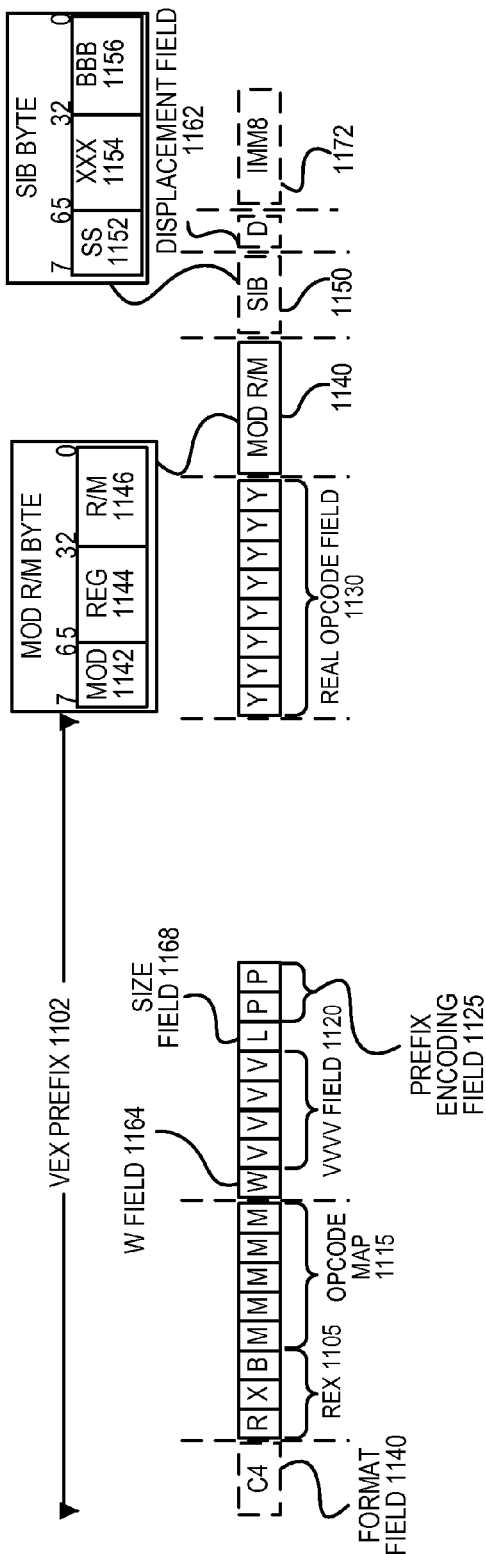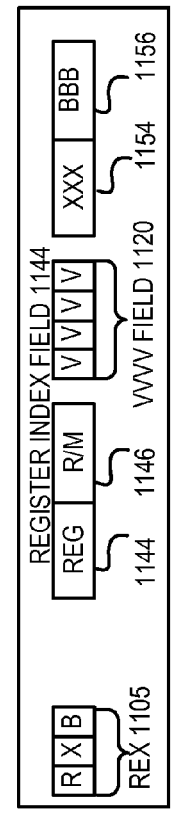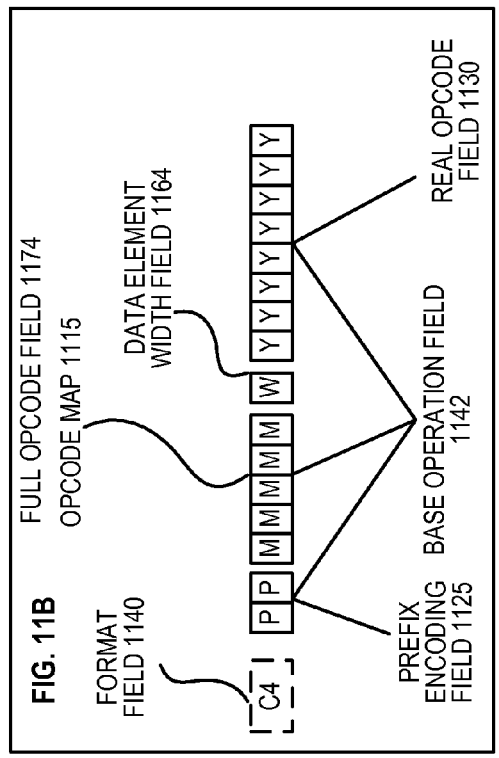

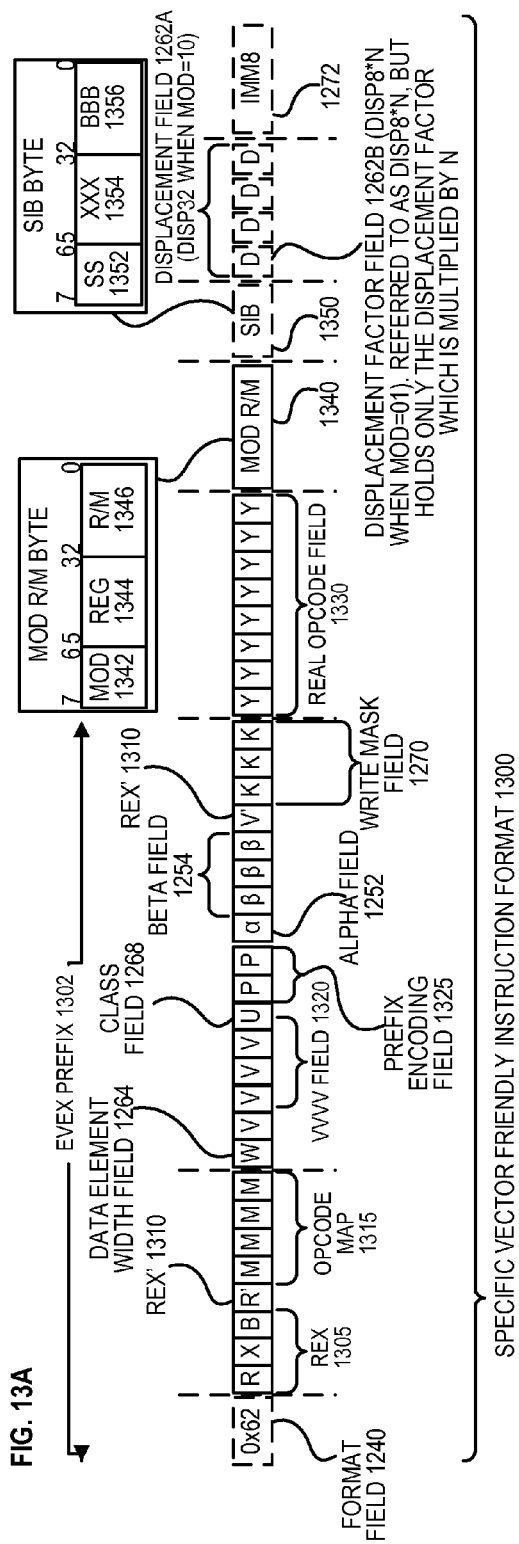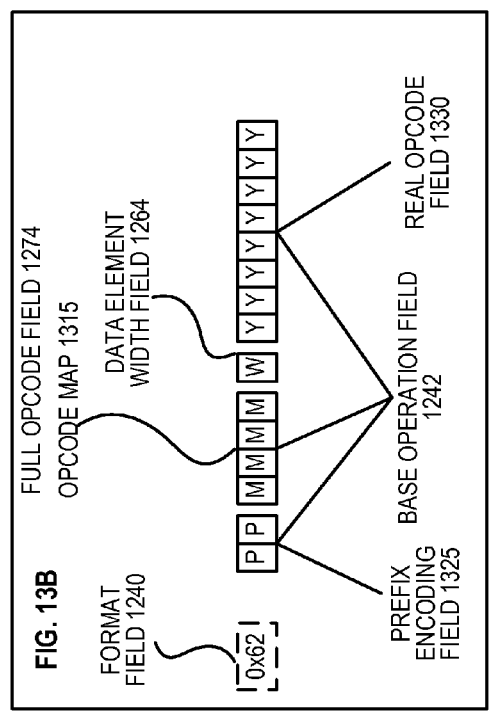

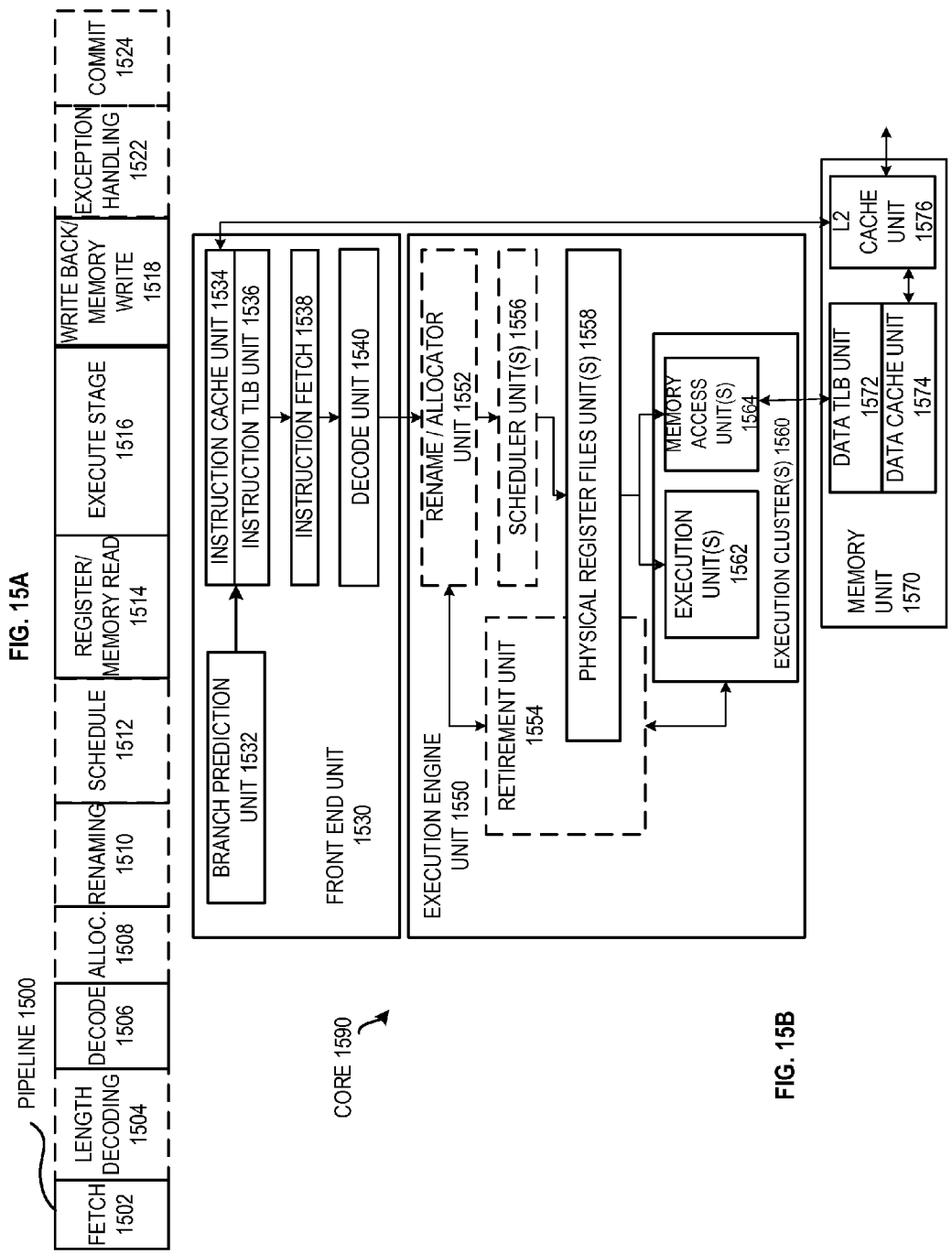

THREE-DIMENSIONAL MORTON COORDINATE CONVERSION PROCESSORS, METHODS, SYSTEMS, AND INSTRUCTIONS

BACKGROUND

Technical Field

Embodiments described herein generally relate to processors. In particular, embodiments described herein generally relate to converting between different coordinate systems within processors.

Background Information

Computer systems and other electronic devices often utilize data that is organized in data structures. The data structures may represent particular arrangements or organizations of the data. One common type of data structure often used in computer systems is an array, such as a two-dimensional (2D) array.

FIG. 1 illustrates an example of a two-dimensional (2D) array 100 in which data items (e.g., the values 7, 16, 24, 27, etc.) are arranged in two dimensions. Representatively, the 2D data structure may represent a table, matrix, or the like. In the illustration, the two dimensions are defined by a first dimension or x-axis 102, and a second dimension or y-axis 104. The x-axis and y-axis are mutually perpendicular and define a 2D grid in which the data items are arranged. The data items in the 2D array may be identified by the values of the x and y indices or coordinates along the two axis. The x-coordinate represents the distance and/or relative position along the x-axis measured from the origin where the two axis intersect, whereas the y-coordinate represents the distance and/or relative position along the y-axis measured from the origin. In the illustrated example, the x-coordinates and the y-coordinates have the values of 0, 1, 2, and 3. Representatively, the coordinates or indices may represent row and column numbers. By way of example, the data item having the value of 14 may be identified by the x,y-coordinates (1,2) which may indicate the data item in column 2, row 3. Other examples are contemplated where the 2D data structure represents a Cartesian coordinate system, and the coordinates may represent locations of points in the Cartesian coordinate system.

Within computer systems and other electronic devices, such arrays and other data structures may be stored in memory or other linear storage. Different ways are possible for storing the 2D and other multi-dimensional arrays in memory. For example, the 2D arrays may be stored in row-major order. In row-major order, the rows of the array are contiguous in the memory. For example, the data items may be stored in the memory in the order 27, 3, 8, 11, 9, 24, 7, 1, 8, 14, 16, 2, 7, 16, 4, and 20. Alternatively, the 2D arrays may be stored in the memory in column-major order. In column-major order, the columns of the array are contiguous in the memory. For example, the data items may be stored in the memory in the order 27, 9, 8, 7, 3, 24, 14, 16, 8, 7, 16, 4, 11, 1, 2, and 20.

BRIEF DESCRIPTION OF THE DRAWINGS

The invention may best be understood by referring to the following description and accompanying drawings that are used to illustrate embodiments. In the drawings:

FIGS. 11A-11C are block diagrams illustrating a generic vector friendly instruction format and instruction templates thereof, according to embodiments of the invention.

FIG. 13A-D is a block diagram illustrating an exemplary specific vector friendly instruction format and fields thereof, according to embodiments of the invention.

FIG. 15A is a block diagram illustrating an embodiment of an in-order pipeline and an embodiment of a register renaming out-of-order issue/execution pipeline.

FIG. 15B is a block diagram of an embodiment of processor core including a front end unit coupled to an execution engine unit and both coupled to a memory unit.

DETAILED DESCRIPTION OF EMBODIMENTS

Figure 1:
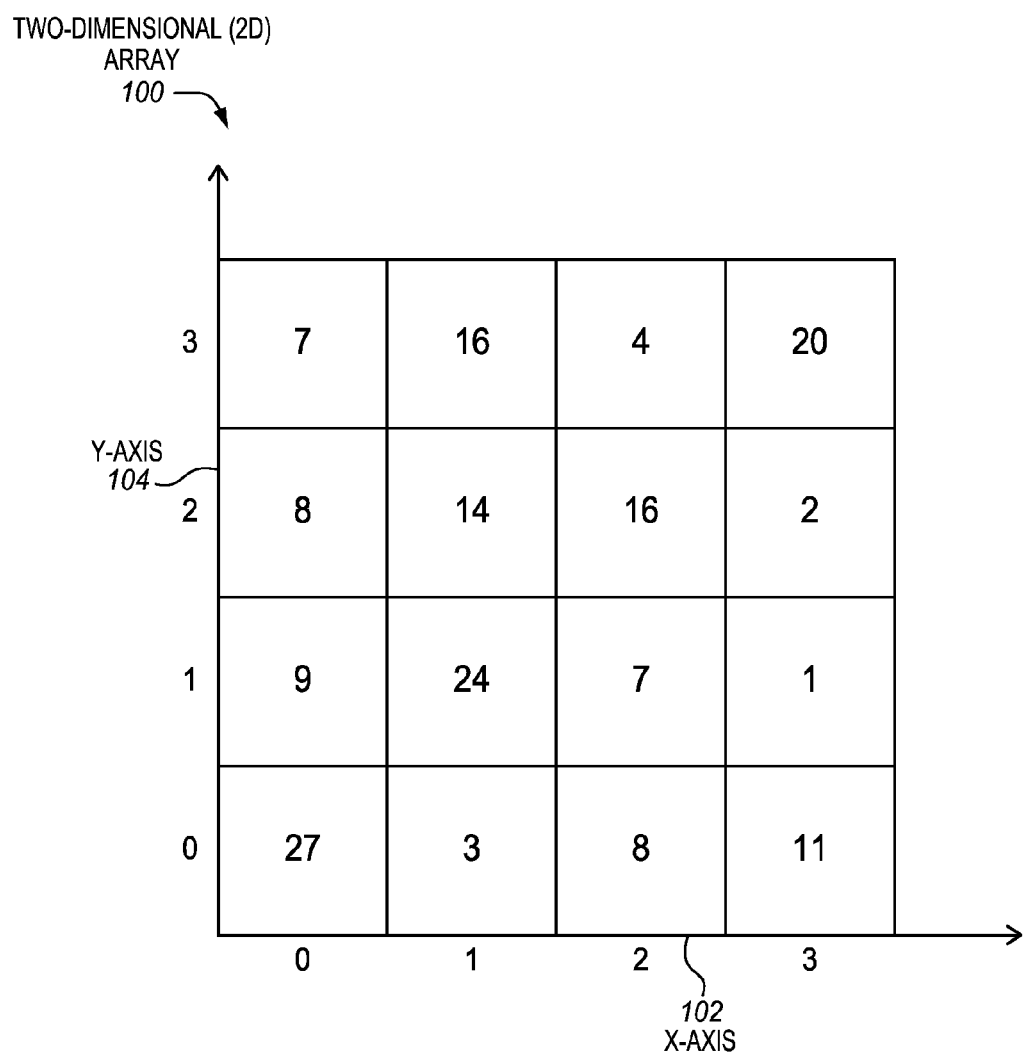
FIG. 1 illustrates an example of a two-dimensional (2D) array.

Disclosed herein are three-dimensional (3D) Morton coordinate conversion instructions to convert 3D Morton coordinates into three 3D coordinates (e.g., x, y, and z-coordinates), processors to execute the instructions, methods performed by the processors when processing or executing the instructions, and systems incorporating one or more processors to process or execute the instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

One challenge is that the way data items are stored in memory or linear storage may significantly affect the performance of algorithms that use the data items. For one thing, the data items generally need to be read into a processor from the memory, but only a limited number of bits can be read into the processor from the memory at one time. For example, commonly processors are only able to read 512-bits of contiguous data from the memory at a time (e.g., in a single read operation). Different data items will be read in contiguous order depending upon whether the data items are stored in row-major order, column-major order, or some other order. For example, if the data items are stored in row-major order, then the data items may be read in the order 27, 3, 8, 11, 9, 24, and so on, up to a maximum of 512-bits. Conversely, if the data items are stored in row-major order, then the data items may be read in the order 27, 9, 8, 7, 3, 24, and so on, up to a maximum of 512-bits. Generally, each read operation from the memory may only be able to obtain some of the data items of interest from the array. By way of example, especially when the arrays are large (e.g., have at least more than 512-bits), if the data items are stored in row-major order, it may not even be possible to obtain neighboring data in different rows but the same column (e.g., data items 27 and 9) from the first column of the array in the same read operation, even though these data items are adjacent to one another in the array. Analogous situations may be encountered when the data are in column-major order, and for storage of data for 3D and 4D arrays.

The way the data items are arranged in the memory also generally affects the ability to efficiently cache the data items in one or more caches of the processor. Accesses to data items in the cache(s) typically have lower latencies than accesses to data items in the memory. However, even if data items of interest are in the cache(s), poor cache utilization may tend to result if the data items are scattered among many different cache lines. Commonly, each cache line stores 512-bits of contiguous data that has been read from the memory. If the data items are not arranged in the memory in way that is efficient for the relevant algorithm using the data, then the data items may be sparse in the cache lines. In a severe scenario, each cache line may hold only a single data item of interest. Conversely, if the data items were to be arranged in the memory in a way that is highly efficient for the particular algorithm, then the data items of interest may be more densely packed into the cache lines with each cache line containing from multiple to many data items of interest. This may help to improve the effectiveness of the cache(s). Similarly, if the data items were to be arranged in the memory in a way that is highly efficient for the particular algorithm, then more data items of interest could be read into the processor in each read operation at least on average. Accordingly, approaches that would allow the data to be arranged in the memory in a way that is efficient for the particular algorithm may help to improve performance.

There are various different types of algorithms that tend to process data that has multi-dimensional locality or proximity relative to other data. As one example, image processing algorithms (e.g., red eye reduction, compression, etc.) often tend to process data for groups of adjacent, neighboring, or otherwise proximate pixels together or concurrently. The algorithms may be relatively more interested in data for a block of neighboring pixels, rather than data for all the pixels in a single row or column (e.g., as may be the case in a row-major or column-major arrangement). Similarly, in many video processing algorithms (e.g., compression, video surveillance analysis, robotic vision, etc.) it is common to process the data for groups of neighboring pixels and/or the data in corresponding pixels of sequential video frames together or concurrently. For example, compression is often achieved by storing differences between such pixels rather than absolute pixel values. Examples of other applications or algorithms that also tend to utilize data with multi-dimensional locality include, but are not limited to, tomographic analysis, seismic analysis, geometric modeling, matrix operations (e.g., matrix multiply and/or transpose), finite element analysis, ray tracing, Fourier transforms, parallel data construction applications, and graphics applications, to name just a few. However, as discussed above, especially when relatively large arrays are involved, row-major order, column major order, and various other arrangements of the data often do not provide efficient arrangements of the data for applications that heavily utilize data with multi-dimensional locality. As a result, other ways of organizing the data that preserve multi-dimensional locality would tend to offer certain advantages for certain applications.

A Z-order curve, also known as a Morton order curve, is a continuous space-filling curve or function that is able to map multi-dimensional data to a single dimension while preserving the multi-dimensional locality or proximity of the data. That is, the Morton order curve may map data in a 2D, 3D, 4D, or other multi-dimensional space, onto a linear list or arrangement of data in a way that preserves the multi-dimensional locality of the data (e.g., data with locality in the multi-dimensional space also has locality in the linear list or arrangement provided by the Morton curve). The order of the data along the Morton order curve is referred to as Z-curve order or Morton order. Morton order is reflected in each point's Morton code or Morton coordinate. The Z-order curve has as a basic unit a Z-shaped curve that linearly connects four points. The overall Z-order space-filling curve is formed by connecting multiple or many of these Z-shaped curves or units together to fill a 2D, 3D, 4D, or other multi-dimensional space.

Figure 2:
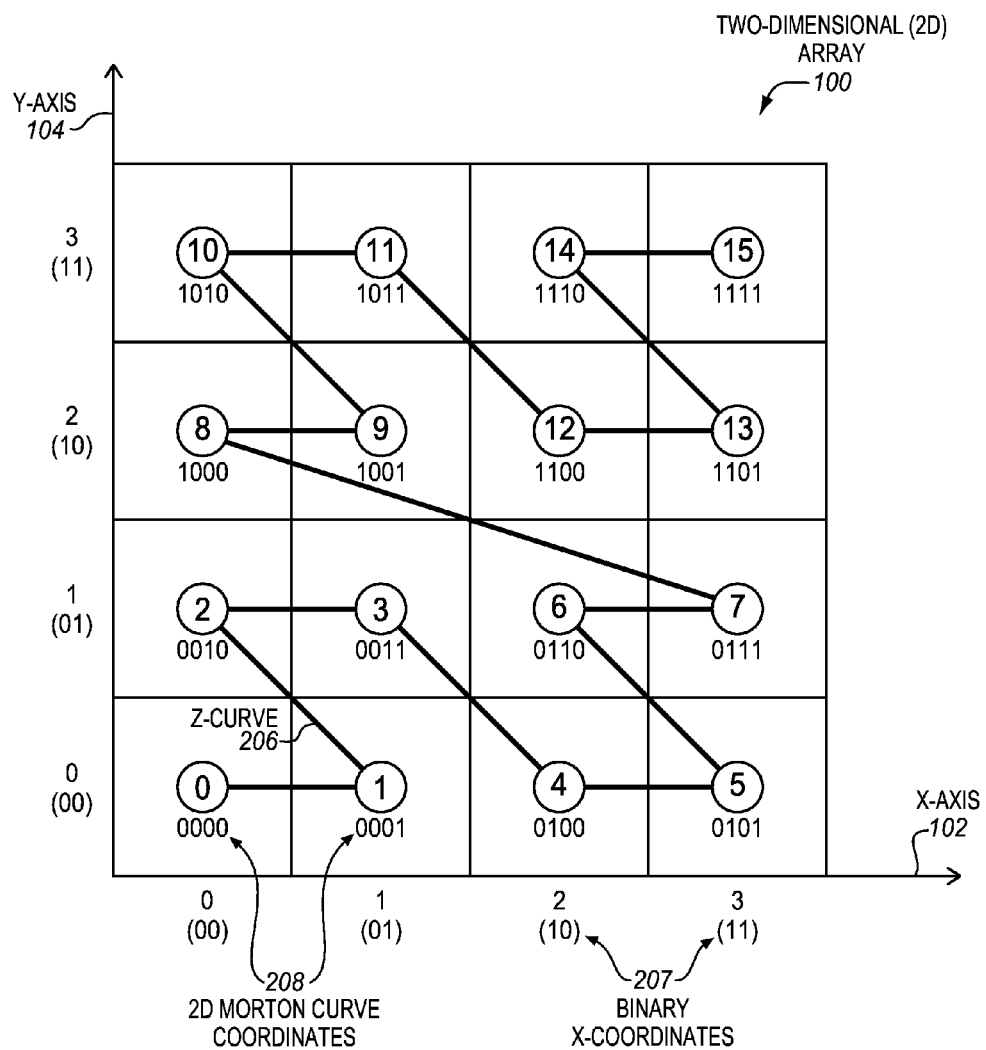
FIG. 2 illustrates an example of a Morton order curve mapped to the 2D array of FIG. 1.

FIG. 2 illustrates an example of a Z-order curve or Morton order curve 206 mapped to the 2D array 100 of FIG. 1. As shown, a number of the Z-shaped curves or units (in this example four) may be connected together in a linear arrangement to traverse or fill all the points in the 2D array. In this example, since there are sixteen data items in the 2D array, four Z-shaped units, each having four points, entirely traverse the sixteen data item 2D array. In the illustration, the coordinates are shown in decimal notation (e.g., 1, 2, 3, etc.). Equivalent binary representations 207 of the coordinates are also shown in parenthesis (e.g., 10, 11.) alongside the decimal coordinates. By way of example, the decimal coordinate value 2 is equivalent to the binary index value "10".

Mapping the Morton order curve to the array involves determining the Morton codes or coordinates 208 of points or data items of the array. The Morton coordinates of the individual points along the Morton order curve may be calculated by interleaving the bits of the binary representations of the multiple multi-dimensional coordinates in a fixed pattern. For example, if the first and second bits of the x-coordinate are represented respectively as x1 and x2, and if the first and second bits of the y-coordinate are represented respectively as y1 and y2, then the Morton coordinate for a point may be calculated by interleaving the bits into the order x1y1x2y2. To further illustrate, the Morton coordinate for the point (x=1, y=0) may be found by interleaving the bits of the binary representations for these coordinates (i.e., 01, 00) to achieve the Morton coordinate 208 of value "0001". Similarly, in 3D and 4D, the 3D or 4D Morton coordinates may be found by interleaving the bits of the binary representations for three and four coordinates, respectively. In the opposite direction, calculating the binary representations of the multiple multi-dimensional coordinates involves the reverse fixed de-interleaving the bits of the Morton coordinates into the separate coordinates. For example, the Morton coordinate x1y1x2y2 may converted into the binary representations of the x and y-coordinates by de-interleaving the bits x1y1x2y2 to generate the x-coordinate as x1x2 and the y-coordinate as y1y2. To further illustrate, the Morton coordinate "0001" may be converted into the binary representation of the x-coordinate "01" and y-coordinate "00". Similarly, in 3D and 4D, the binary representations of three or four different coordinates may be found by de-interleaving the bits of the 3D or 4D Morton coordinates.

Due in part to its ability to represent multi-dimensional locality in data, 2D, 3D, or 4D arrays may be rearranged to corresponding 2D, 3D, or 4D Morton order representations in order to help improve the performance of certain types of applications. For example, before an application processes data it may be rearranged in the memory from a 2D, 3D, or 4D array to a corresponding 2D, 3D, or 4D Morton order representation. After that application has processed the data, it may be desirable to convert the 2D, 3D, or 4D Morton order representation back to the 2D, 3D, or 4D arrays. In other scenarios, the data may initially be organized in a 2D, 3D, or 4D Morton order representation and rearranged to a 2D, 3D, or 4D array in order to improve performance, or for other reasons. In any event, it is often desirable to convert between Morton order arrangements and multi-dimensional arrays and/or multi-dimensional spaces. Such conversions generally tend to be computationally intensive. Instructions that are able to accelerate such conversions may help to improve performance.

Figure 3:
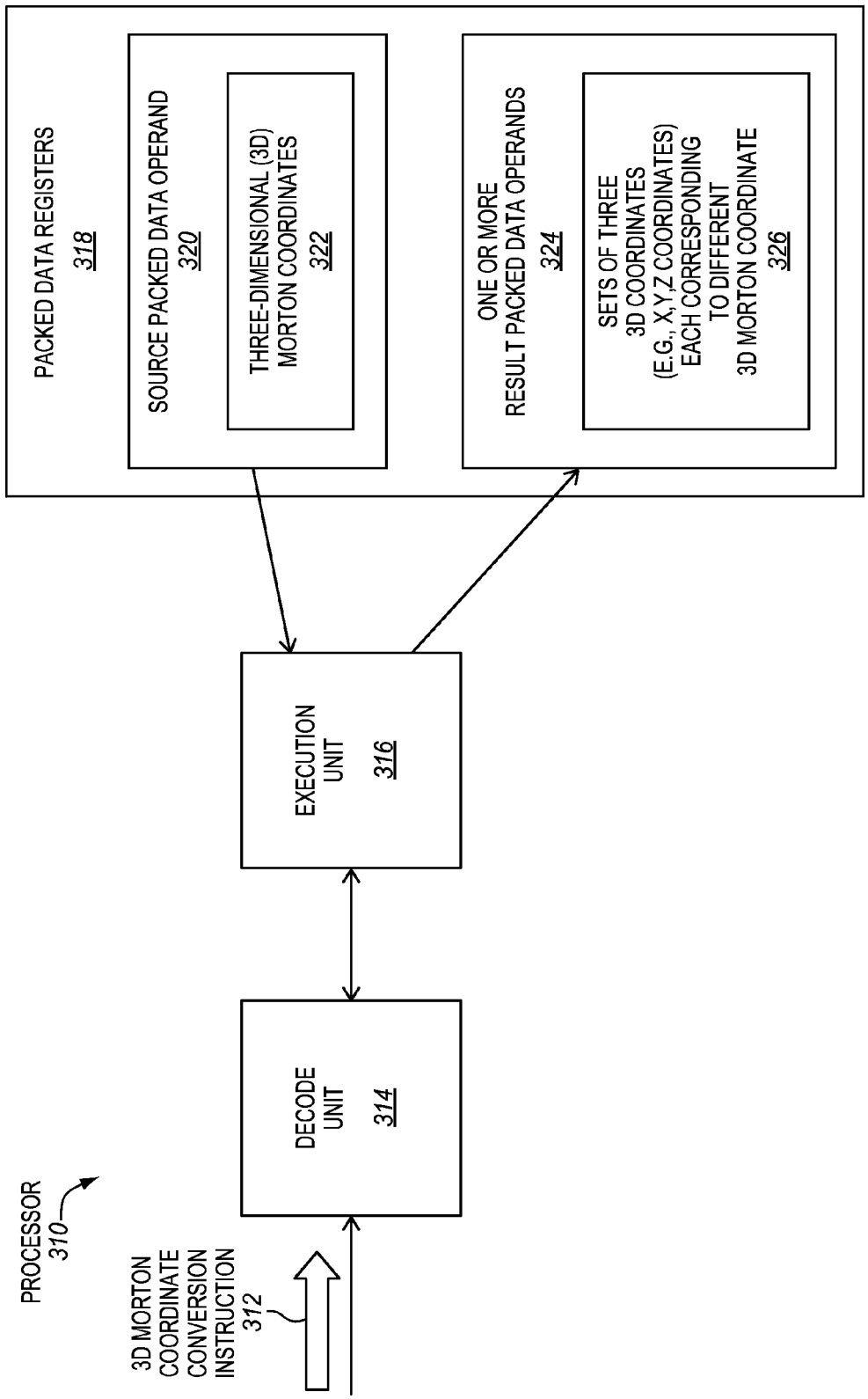
FIG. 3 is a block diagram of an embodiment of a processor that is operable to perform an embodiment of a 3D Morton coordinate conversion instruction.

FIG. 3 is a block diagram of an embodiment of a processor 310 that is operable to perform an embodiment of a 3D Morton coordinate conversion instruction 312. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

During operation, the processor 310 may receive the 3D Morton coordinate conversion instruction 312. For example, the instruction may be fetched or otherwise received from memory on an interconnect. The instruction may represent a macroinstruction, assembly language instruction, machine code instruction, or other instruction or control signal of an instruction set of the processor.

Referring again to FIG. 3, the processor includes a decode unit or decoder 314. The decode unit may receive and decode the 3D Morton coordinate conversion instruction. The 3D Morton coordinate conversion instruction may be part of an instruction set of the processor. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level 3D Morton coordinate conversion instruction. The decode unit may be implemented using various different mechanisms including, but not limited to, microcode read only memories (ROMs), look-up tables, hardware implementations, programmable logic arrays (PLAs), and other mechanisms suitable to implement decode units.

In some embodiments, instead of the 3D Morton coordinate conversion instruction being provided directly to the decode unit, an instruction emulator, translator, morpher, interpreter, or other instruction conversion module may optionally be used. Various types of suitable instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the 3D Morton coordinate conversion instruction, which may be of a first instruction set, and may emulate, translate, morph, interpret, or otherwise convert the 3D Morton coordinate conversion instruction into one or more corresponding intermediate instructions or control signals, which may be of a second different instruction set. The one or more intermediate instructions or control signals of the second instruction set may be provided to the decode unit, which may decode them into one or more lower-level instructions or control signals executable by native hardware of the processor (e.g., one or more execution units).

Referring again to FIG. 3, the processor also includes a set of packed data registers 318. Each of the packed data registers may represent an on-die storage location that is operable to store packed data, vector data, or Single instruction, multiple data (SIMD) data. In SIMD architectures, a packed data instruction, vector instruction, or SIMD instruction may operate on multiple data elements or multiple pairs of data elements simultaneously or in parallel. The processor may have parallel execution hardware responsive to the packed data instruction to perform the multiple operations simultaneously or in parallel. Multiple data elements may be packed within one register or memory location as packed data or vector data. In packed data, the bits of the register or other storage location may be logically divided into a sequence of data elements. For example, a 256-bit wide packed data register may have four 64-bit wide data elements, eight 32-bit data elements, sixteen 16-bit data elements, etc. Each of the data elements may represent a separate individual piece of data (e.g., a pixel color, a coordinate, etc.), which may be operated upon separately and/or independently of the others. The packed data registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The packed data registers may be implemented in different ways in different microarchitectures using known techniques and are not limited to any particular type of design. Examples of suitable types of registers include, but are not limited to, dedicated physical registers, dynamically allocated physical registers using register renaming, and combinations thereof.

In some embodiments, the instruction may explicitly specify (e.g., through one or more fields or a set of bits), or otherwise indicate (e.g., implicitly indicate), a source packed data operand 320 that is to include multiple 3D Morton coordinates, and may specify or otherwise indicate one or more destination storage locations where one or more result packed data operands 324 are to be stored. As one example, the instruction may have operand specification fields to specify registers, memory locations, or other storage locations for one or more of the source and result operands. Alternatively, one or more of the operands may optionally be implicit to the instruction (e.g., implicit to an opcode of the instruction). As another option, a storage location used for a source operand may also be reused as for a result operand (e.g., it may be implicit to the instruction to use the same storage location initially for a source operand and later for a result operand). As shown, in some embodiments, the source packed data operand 320 may optionally be stored in a first packed data register. As further shown, in some embodiments, the one or more result packed data operands 324 may be stored in one or more packed data registers. Alternatively, in some embodiments, a packed data register used for a source packed data operand may optionally be reused to store a result packed data operand. In one aspect, a source/destination register may be implicitly or impliedly understood to be used for both a source operand and a result operand. Moreover, the use of packed data registers are not required, since memory locations, or other storage locations, may optionally be used for one or more of these operands.

Referring again to FIG. 3, the execution unit 316 is coupled with the decode unit 314 and the packed data registers 318. The execution unit may receive the one or more decoded or otherwise converted instructions or control signals that represent and/or are derived from the 3D Morton coordinate conversion instruction 312. The execution unit may also receive the source packed data operand 320 that is to include a plurality of 3D Morton coordinates. The execution unit is operable in response to and/or as a result of the 3D Morton coordinate conversion instruction (e.g., in response to one or more instructions or control signals decoded from the instruction) to store the one or more result packed data operands 324 in the one or more destination storage locations indicated by the instruction. In some embodiments, the one or more result packed data operands may include a plurality of sets of three 3D coordinates. In some embodiments, the three 3D coordinates may represent an x, y, and z-coordinates of a 3D space, 3D array, or other 3D data structure. The x, y, and z are broadly used herein to designate three different dimensions and are not limited to those dimensions being 3D space but rather they may represent any other desired properties of interest (e.g., pressure, time, temperature, etc.). Each of the sets of the 3D coordinates (e.g., each set of x,y,z-coordinates) may to correspond to a different one of the 3D Morton coordinates. In some embodiments, the result may be any of those shown and described for FIGS. 5-8, although the scope of the invention is not so limited.

In some embodiments, the instruction may cause the execution unit to perform a three-way bitwise fixed de-interleave of bits of each of the 3D Morton coordinates. For example, the value of every third bit of a given Morton coordinate starting with the first bit may be stored concatenated together as a first corresponding coordinate (e.g., an x-coordinate) in the one or more result packed data operands, the value of every third bit of the given Morton coordinate starting with the second bit may be stored concatenated together as a second corresponding coordinate (e.g., a y-coordinate) in the one or more result packed data operands, and the value of every third bit of the given Morton coordinate starting with the third bit may be stored concatenated together as a third corresponding coordinate (e.g., an z-coordinate) in the one or more result packed data operands. Notice that there is a stride of 3-bits and an offset of 0-bits, 1-bit, and 2-bits. To further illustrate, the execution unit may store at least the values of the bits at positions 0, 3, 6, 9, 12, 15, and 18 (and in some embodiments also optionally one or more of positions 21, 24, 27) in a contiguous lowest order string of bits corresponding to a first 3D coordinate (e.g., an x-coordinate) of a set of 3D coordinates corresponding to the given 3D Morton coordinate. Similarly, the execution unit may store at least the values of the bits at positions 1, 4, 7, 10, 13, 16, and 19 (and in some embodiments also optionally one or more of positions 22, 25, 28) in a contiguous lowest order string of bits corresponding to a second 3D coordinate (e.g., a y-coordinate) of the corresponding set of 3D coordinates. Likewise, the execution unit may store at least the values of the bits at positions 2, 5, 8, 11, 14, 17, and 20 (and in some embodiments also optionally one or more of positions 23, 26, 29) in a contiguous lowest order string of bits corresponding to a third 3D coordinate (e.g., a z-coordinate) of the corresponding set of 3D coordinates.

In some embodiments, three result packed data operands may be stored in three corresponding destination storage locations (e.g., packed data registers) indicated by the coordinate conversion instruction. In some embodiments, each of the three result packed data operands may optionally include a plurality of 3D coordinates that all correspond to a same dimension (e.g., all x-coordinates in a first result operand, all y-coordinates in a second result operand, all z-coordinates in a third result operand). Alternatively, a single result packed data operand may optionally be stored in a single destination storage location (e.g., a single packed data register) indicated by the coordinate conversion instruction. In some embodiments, each set of three 3D coordinates (e.g., an x-coordinate, a y-coordinate, and a z-coordinate) may optionally be stored in a single data element in a same relative position as the corresponding 3D Morton coordinate (e.g., an x,y,z coordinate tuple may optionally be stored in a single 32-bit result data element).

The execution unit and/or the processor may include specific or particular logic (e.g., transistors, integrated circuitry, or other hardware potentially combined with firmware (e.g., instructions stored in non-volatile memory) and/or software) that is operable to perform the 3D Morton coordinate conversion instruction and/or store the result in response to and/or as a result of the 3D Morton coordinate conversion instruction (e.g., in response to one or more instructions or control signals decoded from the 3D Morton coordinate conversion instruction). By way of example, the execution unit may include a logic unit, an arithmetic logic unit, or the like. In some embodiments, the execution unit may utilize multiplexers to perform the three-way bitwise fixed de-interleave. In other embodiments, various different types of masking and logical operations may be used to perform the three-way bitwise fixed de-interleave.

To avoid obscuring the description, a relatively simple processor 310 has been shown and described. However, the processor may optionally include other components. Possible examples of such components include, but are not limited to, the components shown and described for any of FIGS. 9 and/or any of 16-19. Various different embodiments may include various different combinations and configurations of such components. Such components may be coupled with one another in order to allow them to operate according to their operation. In some embodiments, all of the components may be included in at least one core, some cores, a subset of the cores, or all of the cores of the processor. In various embodiments, the processor may have at least one, two, four, eight, sixteen, thirty-two, or more cores.

Figure 4:
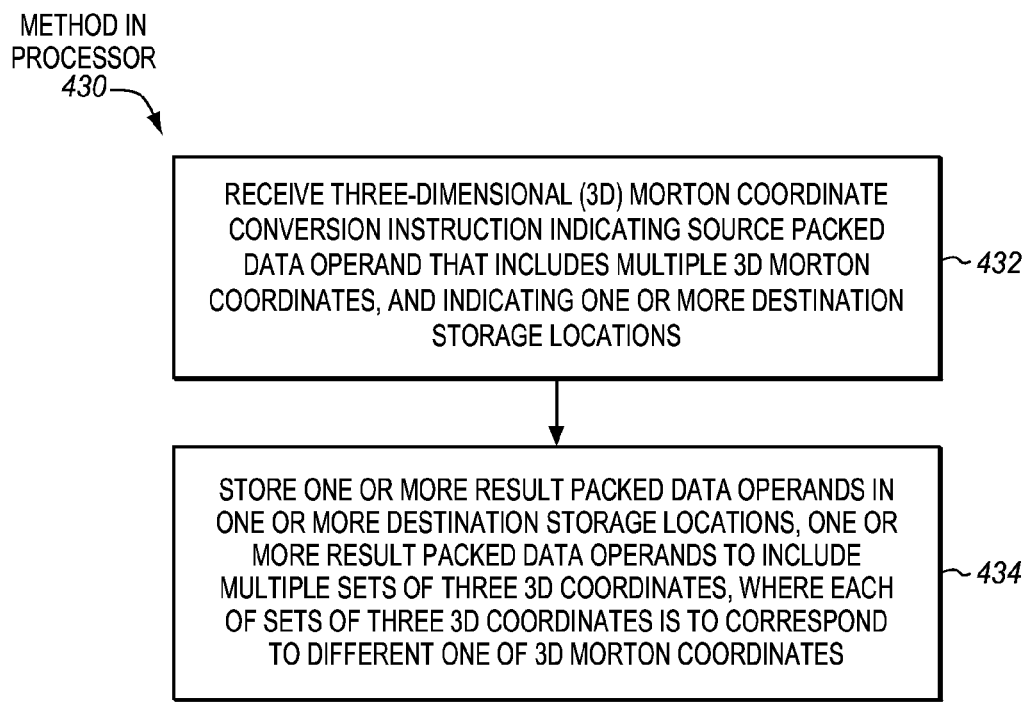
FIG. 4 is a block flow diagram of an embodiment of a method of performing an embodiment of a 3D Morton coordinate conversion instruction.

FIG. 4 is a block flow diagram of an embodiment of a method 430 of performing an embodiment of a 3D Morton coordinate conversion instruction. In various embodiments, the method may be performed by a processor, instruction processing apparatus, or other digital logic device. In some embodiments, the method of FIG. 4 may be performed by and/or within the processor of FIG. 3. The components, features, and specific optional details described herein for the processor of FIG. 3, also optionally apply to the method of FIG. 4. Alternatively, the method of FIG. 4 may be performed by and/or within a similar or different processor or apparatus. Moreover, the processor of FIG. 3 may perform methods the same as, similar to, or different than those of FIG. 4.

The method includes receiving the 3D Morton coordinate conversion instruction, at block 432. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). The 3D Morton coordinate conversion instruction may specify or otherwise indicate a source packed data operand that includes a plurality of 3D Morton coordinates, and may specify or otherwise indicate one or more destination storage locations.

One or more result packed data operands may be stored in the one or more destination storage locations, in response to and/or as a result of the 3D Morton coordinate conversion instruction, at block 434. In some embodiments, the result may include a plurality of sets of three 3D coordinates. Each of the sets of the three-dimensional coordinates corresponds to a different one of the three-dimensional Morton coordinates. In some embodiments, the source packed data operand and one or more result packed data operands may be any of those of FIGS. 5-8, although the scope of the invention is not so limited.

The illustrated method involves architectural operations (e.g., those visible from a software perspective). In other embodiments, the method may optionally include one or more microarchitectural operations. By way of example, the instruction may be prefetched, stored in an instruction cache, fetched by an instruction fetch unit, decoded, scheduled, source operands may be accessed, executed out-of-order with respect to other instructions, an execution unit may perform microarchitectural operations to implement the instruction, etc.

Figure 5:
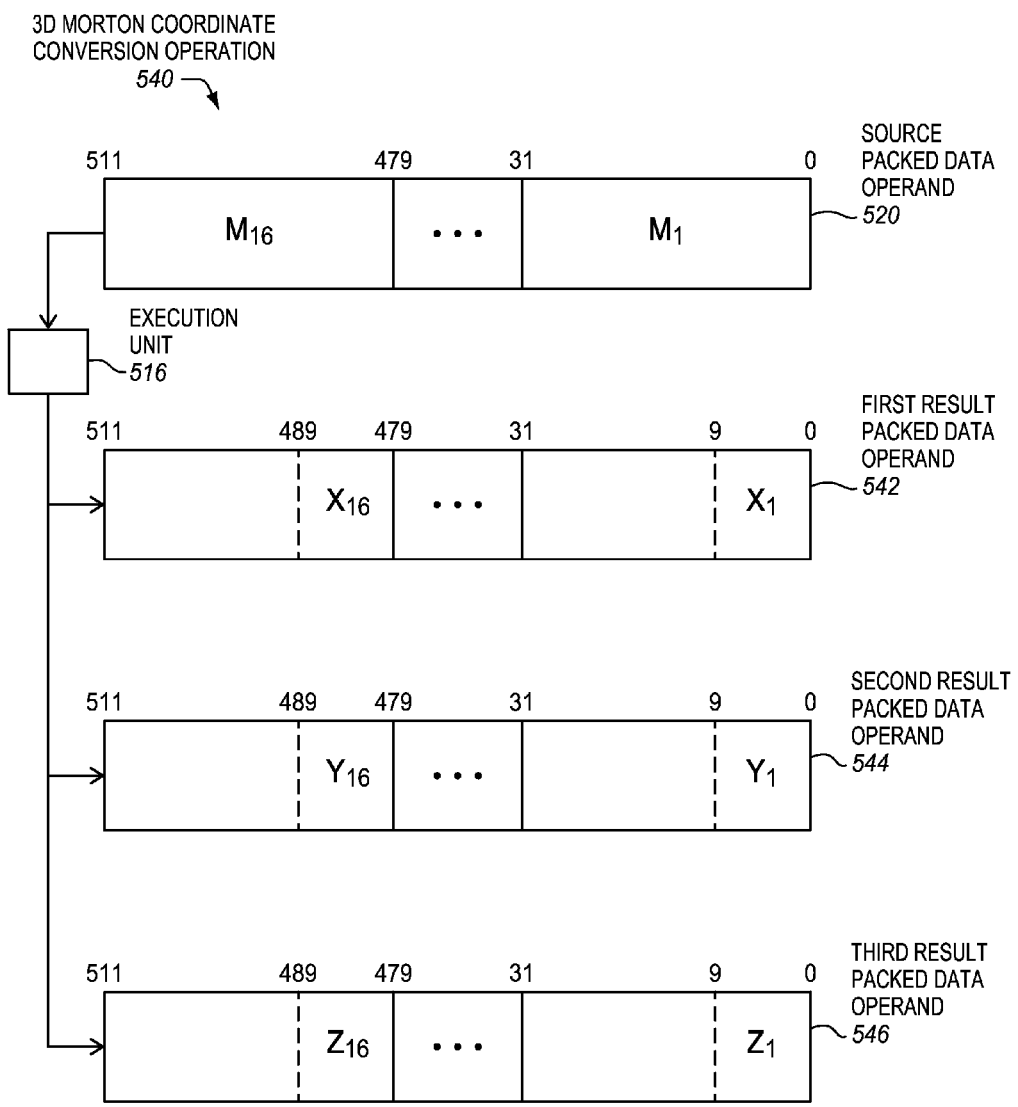
FIG. 5 is a block diagram of an example embodiment of a 3D Morton coordinate conversion operation to convert 3D Morton coordinates stored in 32-bit data elements into three corresponding 3D coordinates that are stored in corresponding data elements of three result packed data operands.

FIG. 5 is a block diagram illustrating an example embodiment of a 3D Morton coordinate conversion operation 540 to convert 3D Morton coordinates (m) that are each stored in a different 32-bit data element of a source packed data operand 520 into three corresponding 3D coordinates (x, y, and z) that are each stored in a corresponding 32-bit data element of a different one of three result packed data operands 542, 544, 546. The operation may be performed in response to an example embodiment of a 3D Morton coordinate conversion to three 3D coordinates instruction.

The instruction may specify or otherwise indicate the source packed data operand 520. The source packed data operand has a plurality of 3D Morton coordinates (m). Each of the 3D Morton coordinates is stored in a different 32-bit data element of the source packed data operand. In the particular illustrated embodiment, the source packed data operand is a 512-bit source packed data operand having sixteen 32-bit data elements, although the scope of the invention is not so limited. The sixteen 32-bit data elements include sixteen corresponding 3D Morton coordinates (m1 to m16). In other embodiments, other widths of the source packed data operand and/or other numbers of 3D Morton coordinates may optionally be used. For example, in various embodiments, the width of the source packed data operand may be 64-bits, 128-bits, 256-bits, 512-bits, or 1024-bits, although the scope of the invention is not so limited. In this example embodiment, the data elements are 32-bit data elements, although the scope of the invention is not so limited. Other sizes of data elements are also suitable, such as, for example, 64-bit data elements. The number of data elements and/or 3D Morton coordinates in the source packed data operand may be the width in bits of the source packed data operand divided by the width in bits of each of the data elements. In various embodiments, there may be at least two, at least four, at least eight, at least sixteen, at least thirty-two, or more than thirty-two data elements and/or 3D Morton coordinates in the source packed data operand.

In this example embodiment, three result packed data operands 542, 544, 546 may be generated (e.g., by an execution unit 516) and stored in response to the instruction. Specifically, a first result packed data operand 520, a second result packed data operand 544, and a third result packed data operand 546 may be generated. These three result packed data operands may be stored in three corresponding destination storage locations that may be specified or otherwise indicated by the instruction. In various embodiments, the destination storage locations may be packed data registers, memory locations, other storage locations, or a combination thereof.

The three result packed data operands include a plurality of sets of three 3D coordinates converted from the plurality of 3D Morton coordinates. Specifically, the three result packed data operands include a same number of sets of three 3D coordinates as a number of 3D Morton coordinates in the source packed data operand. Each of the 3D Morton coordinates corresponds to, and may be converted into, a different corresponding set of three 3D coordinates in the result packed data operands (e.g., in same relative bit positions within the operands). For example, the 3D Morton coordinate (m1) in the least significant (rightmost) 32-bit data element of the source packed data operand may be converted into a first corresponding 3D coordinate (x1) in the least significant (rightmost) 32-bit data element of the first result packed data operand, a second corresponding 3D coordinate (y1) in the least significant 32-bit data element of the second result packed data operand, and a third corresponding 3D coordinate (z1) in the least significant 32-bit data element of the third result packed data operand. Similarly, the 3D Morton coordinate (m16) in the most significant (leftmost) 32-bit data element of the source packed data operand may be converted into a first corresponding 3D coordinate (x16) in the most significant 32-bit data element of the first result packed data operand, a second corresponding 3D coordinate (y16) in the most significant 32-bit data element of the second result packed data operand, and a third corresponding 3D coordinate (z16) in the most significant 32-bit data element of the third result packed data operand. All other coordinates may be similarly or analogously converted. Notice that often, to take advantage of efficiencies from an overall algorithmic perspective, the instruction/operation may store coordinates of the same type in the same result packed data operand (e.g., all the x-coordinates in one result packed data operand, all the y-coordinates in another result packed data operand, and all the z-coordinates in yet another result packed data operand), although this is not required.

As previously mentioned, each of the sets of the three 3D coordinates may be generated from the corresponding 3D Morton coordinate by performing a fixed three-way bitwise de-interleave of the bits of the corresponding 3D Morton coordinate into three contiguous strings of bits that each corresponds to a different one of the three 3D coordinates. In the illustrated example embodiment, the 3D Morton coordinates (m) are each 30-bits, and each of the three corresponding 3D coordinates (x, y, and z) are each 10-bits, although the scope of the invention is not so limited. Three sets of 10-bits each is the maximum identical set size that is able to be contained as a Morton coordinate in a single 32-bit data element (i.e., 10+10+10=30, and 32−30=2). In other embodiments, each of the three 3D coordinates in the result packed data operand may be represented with a same number of bits that is either 7-bits, 8-bits, 9-bits, or 10-bits, and each of the 3D Morton coordinates may have three times that number of bits. For many applications, the number of bits of the three 3D coordinates will be 9-bits or 10-bits to allow a larger coordinate system to be represented.

An operation to convert a given 3D Morton coordinate (e.g., m1) stored in a 32-bit source data element (SRC1) into three corresponding 10-bit 3D coordinates (x1, y1, z1) each stored in a data element of a different corresponding result (RES1, RES2, RES3) may be represented as follows, where the "3" in "0:27:3" represents skipping over bits with a stride of 3-bits:

SRC1[0:27:3]→RES1[0:9]=x1
SRC1[1:28:3]→RES2[0:9]=y1
SRC1[2:29:3]→RES3[0:9]=z1

This designates that the 10-bit x-coordinate may store the values of the bits of a 30-bit 3D Morton coordinate (m) at positions 0, 3, 6, 9, 12, 15, 18, 21, 24, and 27, the 10-bit y-coordinate may store the values of the bits at positions 1, 4, 7, 10, 13, 16, 19, 22, 25, and 28, and the 10-bit z-coordinate may store the values of the bits at positions 2, 5, 8, 11, 14, 17, 20, 23, 26, and 29. To further illustrate, the following Table 1 lists one possible example of the 3D Morton coordinate (m) and its corresponding three 3D coordinates (x, y, z), with lowest order bits on the right, and bits corresponding to the x-coordinate bolded in the Morton coordinate.

TABLE 1

Example of coordinate conversion

| Coordinate | Bit String |
| --- | --- |
| m |  011 100 000 110 011 010 101 010 100 001** |
| x | 1000101001 |
| y | 1001110100 |
| z | 0101001010 |

In the illustrated embodiment, each of the result packed data operands optionally has the same width as the source packed data operand, although this is not required. Since each of the three 3D coordinates has only one third the number of bits as the 3D Morton coordinate, smaller result packed data operands may optionally be used, if desired. For example, the result packed data operands may optionally have half as many bits as the source packed data operand, and each of the three 3D coordinates may be stored in a data element that optionally has only half as many bits as the data elements of the source packed data operand. For example, the result packed data operands may optionally be 256-bit result packed data operands having 16-bit data elements.

Figure 6:
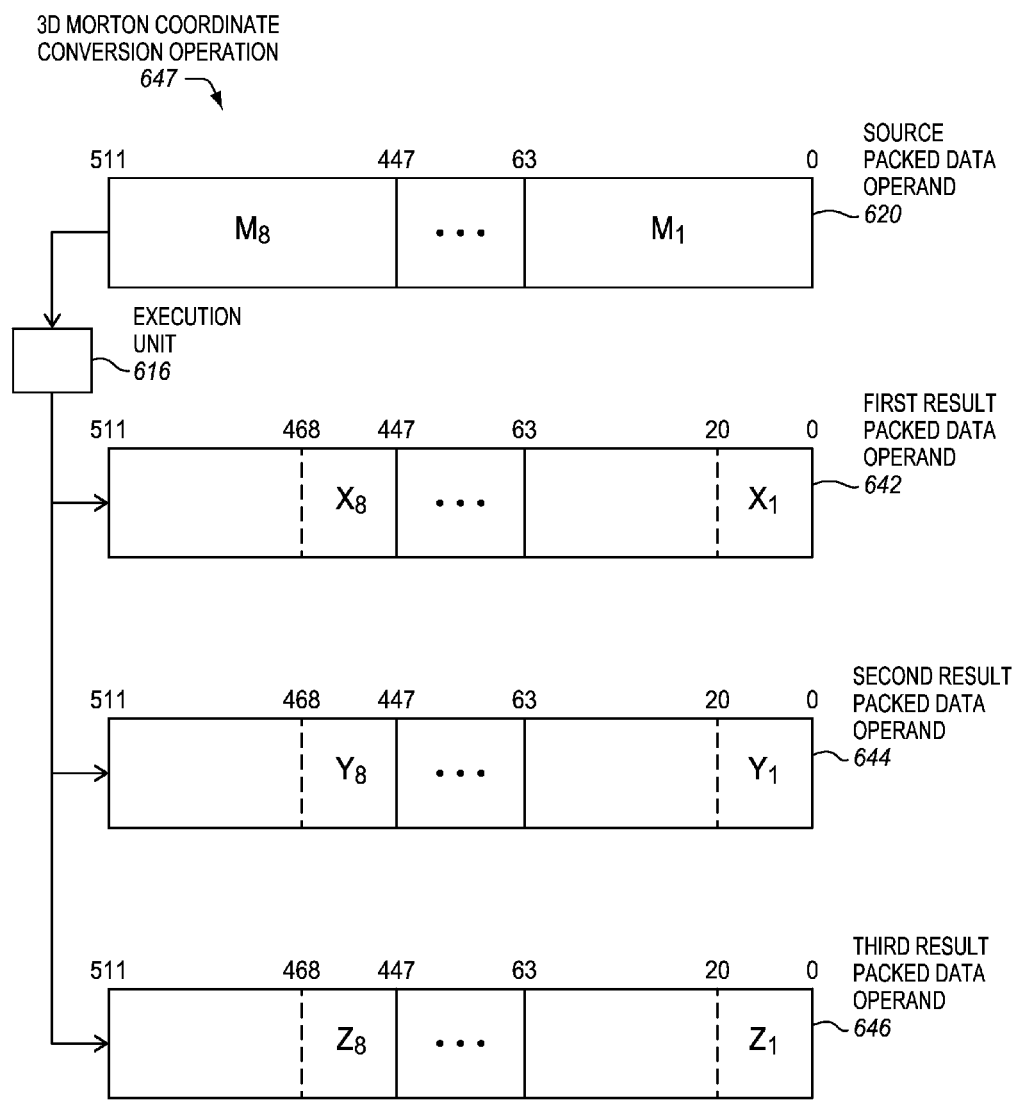
FIG. 6 is a block diagram of an example embodiment of a 3D Morton coordinate conversion operation to convert 3D Morton coordinates stored in 64-bit data elements into three corresponding 3D coordinates that are stored in corresponding data elements of three result packed data operands.

FIG. 6 is a block diagram illustrating an example embodiment of a 3D Morton coordinate conversion operation 647 to convert 3D Morton coordinates (m) that are each stored in a different 64-bit data element of a source packed data operand 620 into three corresponding 3D coordinates (x, y, and z) that are each stored in a corresponding 64-bit data element of a different one of three result packed data operands 642, 644, 646. The operation may be performed in response to an example embodiment of a 3D Morton coordinate conversion to three 3D coordinates instruction.

The operation of FIG. 6 has certain similarities to the operation of FIG. 5, and differs primarily in the widths of the 3D Morton coordinates and corresponding 3D coordinates, and in that the data elements are 64-bit data elements instead of 32-bit data elements. To avoid obscuring the description, the different and/or additional characteristics for the operation of FIG. 6 will primarily be described, without repeating all the optionally similar or common characteristics and details relative to the operation of FIG. 5. However, it is to be appreciated that the previously described characteristics and details of the operation of FIG. 5, including the variations and alternatives, may also optionally apply to the operation of FIG. 6, unless stated otherwise or otherwise clearly apparent.

As previously described, the instruction may specify or otherwise indicate the source packed data operand 620. In this embodiment, each of the 3D Morton coordinates is stored in a different 64-bit data element of the source packed data operand. In the particular illustrated embodiment, the source packed data operand is a 512-bit source packed data operand having eight 64-bit data elements and/or eight 3D Morton coordinates (m1 to m8), although the scope of the invention is not so limited. In other embodiments, the source packed data operand may be either wider or narrower than 512-bits (e.g., 128-bits, 256-bits, 1024-bits, etc.).

In this example embodiment, three result packed data operands 642, 644, 646 may be generated (e.g., by an execution unit 616) and stored in response to the instruction. The three result packed data operands include a number of sets of three 3D coordinates generated or converted from a same number of 3D Morton coordinates in the source packed data operand. Each of the 3D Morton coordinates corresponds to, and may be converted into, a different corresponding set of three 3D coordinates in the result packed data operands (e.g., in same relative bit positions within the operands). For example, the 3D Morton coordinate (m1) in the least significant (rightmost) 64-bit data element of the source packed data operand may be converted into a first corresponding 3D coordinate (x1) in the least significant 64-bit data element of the first result packed data operand, a second corresponding 3D coordinate (y1) in the least significant 64-bit data element of the second result packed data operand, and a third corresponding 3D coordinate (z1) in the least significant 64-bit data element of the third result packed data operand. The other 3D Morton coordinates may be similarly or analogously converted into corresponding sets of three 3D coordinates stored in the result packed data operands.

As previously mentioned, each of the sets of the three 3D coordinates may be generated from the corresponding 3D Morton coordinate by performing a fixed three-way bitwise de-interleave of the bits of the corresponding 3D Morton coordinate into three contiguous strings of bits that each corresponds to a different one of the three 3D coordinates. In the illustrated example embodiment, the 3D Morton coordinates (m) are each 63-bits, and each of the three corresponding 3D coordinates (x, y, and z) are each 21-bits, although the scope of the invention is not so limited. Three sets of 21-bits each is the maximum identical set size that is able to be contained as a Morton coordinate in a single 64-bit data element (i.e., 21+21+21=63, and 64−63=1). In other embodiments, each of the three 3D coordinates in the result packed data operand may be represented with a same number of bits that ranges from 12-bits to 21-bits, or from 15-bits to 21-bits, or from 18-bits to 21-bits, and each of the 3D Morton coordinates may have three times that number of bits. Generally, larger numbers of bits allow more data points and/or larger coordinate systems to be represented.

An operation to convert a given 3D Morton coordinate (e.g., m1) stored in a 64-bit source data element (SRC1) into three corresponding 21-bit 3D coordinates (x1, y1, z1) each stored in a data element of a different corresponding result (RES1, RES2, RES3) may be represented as follows, where the "3" in "0:60:3" represents skipping over bits with a stride of 3-bits:

SRC1[0:60:3]→RES1[0:20]=x1
SRC1[1:61:3]→RES2[0:20]=y1
SRC1[2:62:3]→RES3[0:20]=z1

The 21-bit x-coordinate may store the values of the bits of a 30-bit 3D Morton coordinate (m) at positions 0, 3, 6, 9, 12, and so on up through 60, the 21-bit y-coordinate may store the values of the bits at positions 1, 4, 7, 10, 13, and so on up through 61, and the 10-bit z-coordinate may store the values of the bits at positions 2, 5, 8, 11, 14, and so on up through 62.

Figure 7:
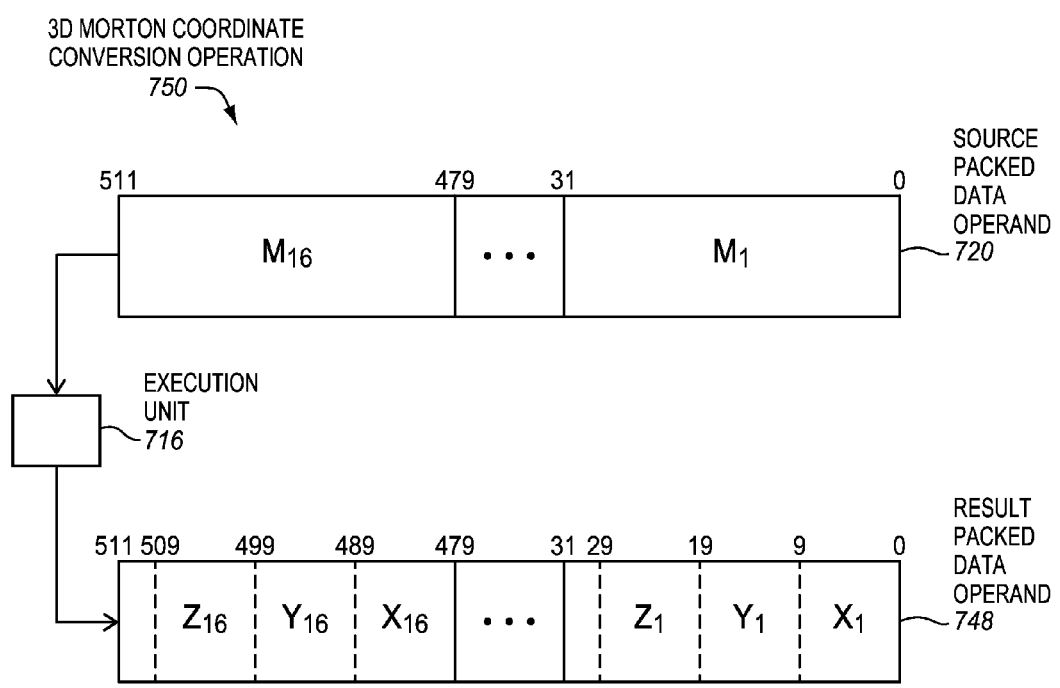
FIG. 7 is a block diagram of an example embodiment of a 3D Morton coordinate conversion operation to convert 3D Morton coordinates stored in 32-bit data elements into three corresponding 3D coordinates that are stored in different portions of a corresponding 32-bit data element of a single result packed data operand.

FIG. 7 is a block diagram illustrating an example embodiment of a 3D Morton coordinate conversion operation 750 to convert 3D Morton coordinates (m) that are each stored in a different 32-bit data element of a source packed data operand 720 into three corresponding 3D coordinates (x, y, and z) that are each stored in different contiguous bit portions of a corresponding 32-bit data element of a single result packed data operand 748. The operation may be performed in response to an example embodiment of a 3D Morton coordinate conversion to three 3D coordinates instruction.

The operation of FIG. 7 has certain similarities to the operation of FIG. 5, and differs primarily in that a set of three 3D coordinates are stored in three different portions of a data element of a single result packed data operand, instead of each being stored in a different data element in a different result packed data operand. To avoid obscuring the description, the different and/or additional characteristics for the operation of FIG. 7 will primarily be described, without repeating all the optionally similar or common characteristics and details relative to the operation of FIG. 5. However, it is to be appreciated that the previously described characteristics and details of the operation of FIG. 5, including the variations and alternatives, may also optionally apply to the operation of FIG. 7, unless stated otherwise or otherwise clearly apparent.

As previously described, the instruction may specify or otherwise indicate the source packed data operand 720. In this embodiment, each of the 3D Morton coordinates is stored in a different 32-bit data element of the source packed data operand. In the particular illustrated embodiment, the source packed data operand is a 512-bit source packed data operand having sixteen 32-bit data elements and/or sixteen 3D Morton coordinates (m1 to m16), although the scope of the invention is not so limited. In other embodiments, the source packed data operand may be either wider or narrower than 512-bits (e.g., 128-bits, 256-bits, 1024-bits, etc.) and have either fewer or more data elements and/or 3D Morton coordinates.

In this example embodiment, a single result packed data operand 748 may be generated (e.g., by an execution unit 716) and stored in response to the instruction. The result packed data operand includes a number of sets of three 3D coordinates generated or converted from a same number of 3D Morton coordinates in the source packed data operand. Each of the 3D Morton coordinates in the source packed data operand corresponds to, and may be converted into, a different corresponding set of three 3D coordinates in the result packed data operand (e.g., in same relative bit positions within the operands). For example, the 3D Morton coordinate (m1) in the least significant (rightmost) 32-bit data element of the source packed data operand may be converted into a set of three coordinates (x1, y1, z1) in the least significant 32-bit data element of the result packed data operand. The other 3D Morton coordinates may be similarly or analogously converted into corresponding sets of three 3D coordinates each stored in a different data element of the result packed data operand.

As previously mentioned, each of the sets of the three 3D coordinates may be generated from the corresponding 3D Morton coordinate by performing a fixed three-way bitwise de-interleave of the bits of the corresponding 3D Morton coordinate into three contiguous strings of bits that each corresponds to a different one of the three 3D coordinates. In the illustrated example embodiment, the 3D Morton coordinates (m) are each 30-bits, and each of the three corresponding 3D coordinates (x, y, and z) are each 10-bits, although the scope of the invention is not so limited. In other embodiments, each of the three 3D coordinates in the result packed data operand may be represented with a same number of bits that ranges from 7-bits to 10-bits, or from 9-bits to 10-bits, and each of the 3D Morton coordinates may have three times that number of bits. Generally, larger numbers of bits allow more data points and/or larger coordinate systems to be represented.

An operation to convert a given 3D Morton coordinate (e.g., m1) stored in a 32-bit source data element (SRC1) into three corresponding 10-bit 3D coordinates (x1, y1, z1) each stored in different contiguous bit portions of a single result data element (RES1) in a single result packed data operand may be represented as follows, where the "3" in "0:27:3" represents skipping over bits with a stride of 3-bits:

SRC1[0:27:3]→RES1[0:9]=x1
SRC1[1:28:3]→RES1[10:19]=y1
SRC1[2:29:3]→RES1[20:29]=z1

This designates that the 10-bit x-coordinate in bits [0:9] of RES1 may store the values of the bits of a 30-bit 3D Morton coordinate (m) at positions 0, 3, 6, 9, 12, 15, 18, 21, 24, and 27, the 10-bit y-coordinate in bits [10:19] of RES1 may store the values of the bits at positions 1, 4, 7, 10, 13, 16, 19, 22, 25, and 28, and the 10-bit z-coordinate in bits [20:29] of RES1 may store the values of the bits at positions 2, 5, 8, 11, 14, 17, 20, 23, 26, and 29. To further illustrate, the following Table 2 lists one possible example of the 3D Morton coordinate (m) and its corresponding three 3D coordinates (x, y, z), with lowest order bits on the right, and bits of the x-coordinate bolded in the Morton coordinate.

TABLE 2

| Coordinate | Bit String |
|---|---|
| m | **110 001 000 011 110 010 101 010 001 100 |
| z\|y\|x | **1000101001 1001110100 0101001010 |

Figure 8:
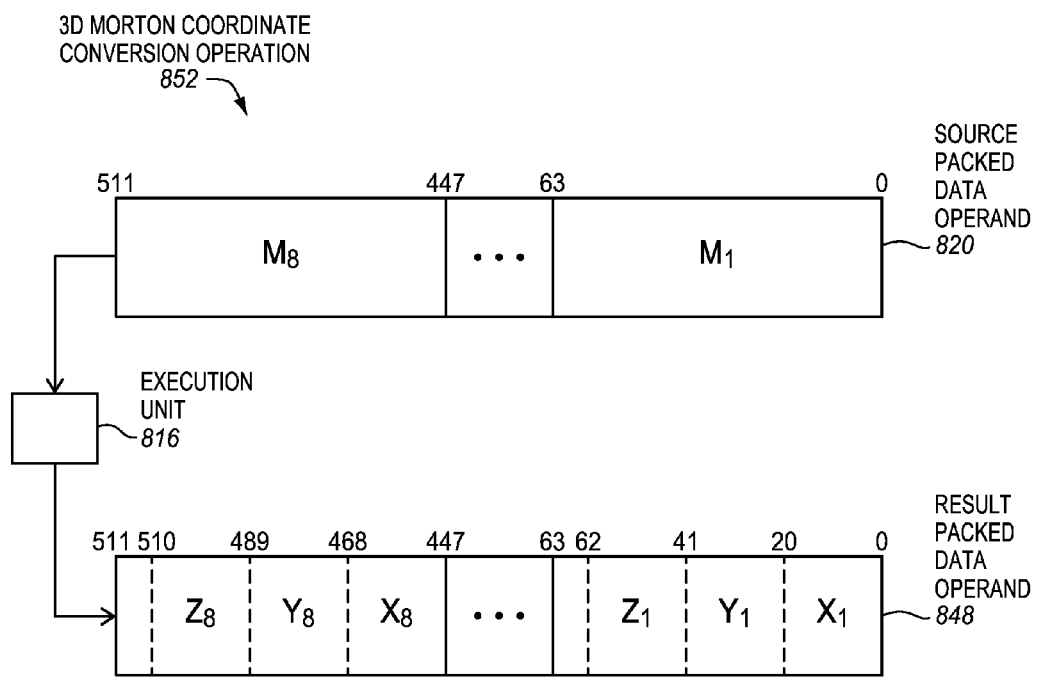
FIG. 8 is a block diagram of an example embodiment of a 3D Morton coordinate conversion operation to convert 3D Morton coordinates stored in 64-bit data elements into three corresponding 3D coordinates that are stored in different portions of a corresponding 64-bit data element of a single result packed data operand.

FIG. 8 is a block diagram illustrating an example embodiment of a 3D Morton coordinate conversion operation 852 to convert 3D Morton coordinates (m) that are each stored in a different 64-bit data element of a source packed data operand 820 into three corresponding 3D coordinates (x, y, and z) that are each stored in different contiguous bit portions of a corresponding 64-bit data element of a single result packed data operand 848. The operation may be performed in response to an example embodiment of a 3D Morton coordinate conversion to three 3D coordinates instruction.

The operation of FIG. 8 has certain similarities to the operation of FIG. 7, and differs primarily in that 64-bit data elements and correspondingly wider 3D Morton coordinates and 3D coordinates are used. To avoid obscuring the description, the different and/or additional characteristics for the operation of FIG. 8 will primarily be described, without repeating all the optionally similar or common characteristics and details relative to the operation of FIG. 7. However, it is to be appreciated that the previously described characteristics and details of the operation of FIG. 7, including the variations and alternatives, may also optionally apply to the operation of FIG. 8, unless stated otherwise or otherwise clearly apparent.

As previously described, the instruction may specify or otherwise indicate the source packed data operand 820. In this embodiment, each of the 3D Morton coordinates is stored in a different 64-bit data element of the source packed data operand. In the particular illustrated embodiment, the source packed data operand is a 512-bit source packed data operand having eight 64-bit data elements and/or eight 3D Morton coordinates (m1 to m8), although the scope of the invention is not so limited. In other embodiments, the source packed data operand may be either wider or narrower than 512-bits (e.g., 128-bits, 256-bits, 1024-bits, etc.) and have either fewer or more data elements and/or 3D Morton coordinates.

In this example embodiment, a single result packed data operand 848 may be generated (e.g., by an execution unit 816) and stored in response to the instruction. The result packed data operand includes a number of sets of three 3D coordinates generated or converted from a same number of 3D Morton coordinates in the source packed data operand. Each of the 3D Morton coordinates in the source packed data operand corresponds to, and may be converted into, a different corresponding set of three 3D coordinates in the result packed data operand (e.g., in same relative bit positions within the operands). For example, the 3D Morton coordinate (m1) in the least significant (rightmost) 64-bit data element of the source packed data operand may be converted into a set of three coordinates (x1, y1, z1) in the least significant 64-bit data element of the result packed data operand. The other 3D Morton coordinates may be similarly or analogously converted into corresponding sets of three 3D coordinates each stored in a different data element of the result packed data operand.

As previously mentioned, each of the sets of the three 3D coordinates may be generated from the corresponding 3D Morton coordinate by performing a fixed three-way bitwise de-interleave of the bits of the corresponding 3D Morton coordinate into three contiguous strings of bits that each corresponds to a different one of the three 3D coordinates. In the illustrated example embodiment, the 3D Morton coordinates (m) are each 33-bits, and each of the three corresponding 3D coordinates (x, y, and z) are each 21-bits, although the scope of the invention is not so limited. In other embodiments, each of the three 3D coordinates in the result packed data operand may be represented with a same number of bits that ranges from 12-bits to 21-bits, or from 15-bits to 21-bits, or from 18-bits to 21-bits, and each of the 3D Morton coordinates may have three times that number of bits.

An operation to convert a given 3D Morton coordinate (e.g., m1) stored in a 64-bit source data element (SRC1) into three corresponding 21-bit 3D coordinates (x1, y1, z1) each stored in different contiguous bit portions of a single result data element (RES1) in a single result packed data operand may be represented as follows, where the "3" in "0:60:3" represents skipping over bits with a stride of 3-bits:

SRC1[0:60:3]→RES1[0:20]=x1
SRC1[1:61:3]→RES1[21:41]=y1
SRC1[2:62:3]→RES1[42:62]=z1

Figure 9:
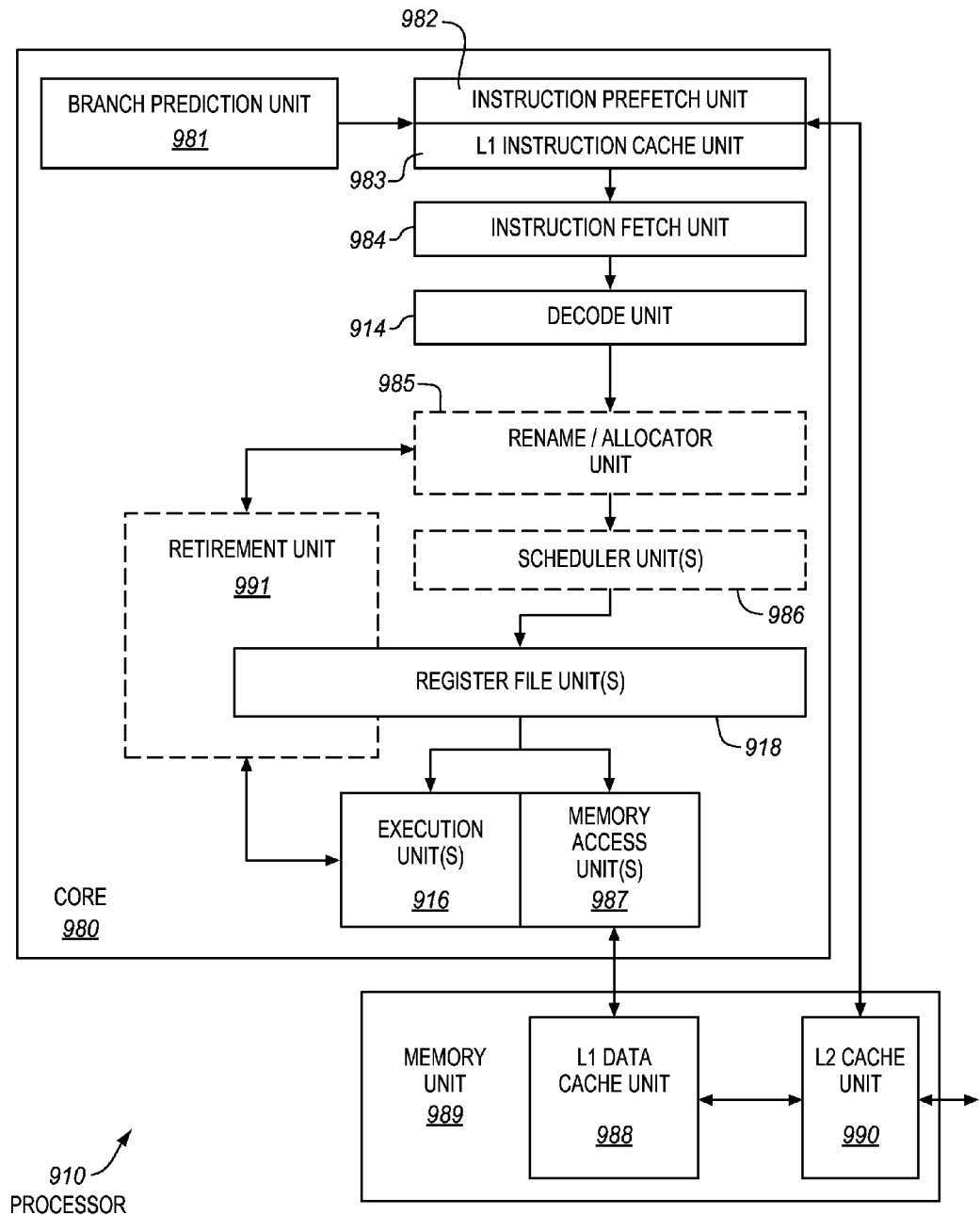
FIG. 9 is a block diagram of a more detailed example embodiment of a suitable processor that is operable to perform an embodiment of a Morton coordinate conversion instruction.

FIG. 9 is a block diagram of a more detailed example embodiment of a suitable processor that is operable to perform an embodiment of a Morton coordinate conversion instruction. The processor includes a core 980. The processor may optionally have multiple cores (e.g. at least two, at least four, at least eight, at least thirty, etc.). In some cases, all of the cores may be the same as the core shown, or in other cases some of the cores may be different (e.g., have different components or instruction sets). In some cases, all of the cores may be able to execute a Morton coordinate conversion as disclosed herein, or in other cases only some of the cores may. The core 980 includes a branch prediction unit 981 to predict branches program flow. The branch prediction unit is coupled with an instruction prefetch unit 982. The instruction prefetch unit may prefetch or otherwise receive instructions, including the Morton coordinate conversion instruction, from external memory through a memory unit 989 coupled therewith. A level 1 (L1) instruction cache is coupled with the instruction prefetch unit. The L1 instruction cache may cache or otherwise store prefetched or otherwise received instructions including the Morton coordinate conversion instruction. An instruction fetch unit 984 is coupled with the L1 instruction cache and a decode unit 914. The instruction fetch unit may fetch or otherwise receive instructions, including the Morton coordinate conversion instruction, from the L1 instruction cache and provide the instructions, including the Morton coordinate conversion instruction, to the decode unit. The decode unit may be the same as, or similar to, the other decode units described herein.

The processor includes one or more register file units 918. Commonly, the register file unit(s) may include various different types of registers, such as, for example, packed data registers, general-purpose registers, a status or flags register, control or configuration registers, etc. In an embodiment using out-of-order (OOO) execution, the processor may also optionally include a register rename and/or allocator unit coupled with the register file unit(s) to allocate resources and perform register renaming on registers (e.g., packed data registers associated with the Morton coordinate conversion instruction). Also, in the case of OOO execution, the processor may optionally include one or more scheduler units 986 coupled with the decode unit, the rename/allocation unit, and one or more execution units 916. The scheduler unit(s) may schedule operations on the execution units. At least one of the execution units may be the same as, or similar to, other execution units disclosed herein. Commonly, the processor may optionally have multiple different types of execution units, such as, for example integer execution units, floating point execution units, vector execution units, one or more memory access units 987 or bus interface units, and the like. In an embodiment using out-of-order (OOO) execution, the processor may also optionally include a retirement or commit unit 991 coupled with the register file unit(s) and the rename/allocator unit 985 to retire or commit instructions. The processor may include an L1 data cache unit 974 to cache or otherwise store data including data elements and/or operands for instructions including the Morton coordinate conversion instruction. A level 2 (L2) cache unit 990 may optionally be included and may optionally be shared by multiple cores. The L2 cache unit may store data and instructions including the Morton coordinate conversion instruction. The processor may also optionally include one or more translation lookaside buffers (not shown) to cache address translation data. In an embodiment using out-of-order (OOO) execution, the processor may also optionally include a reorder buffer (not shown) to reorder execution results and/or one or more reservation stations (not shown). Various embodiments of processors may include various different combinations and configurations of some or all of these components. Embodiments are not limited to any known such combination or configuration.

Figure 10:
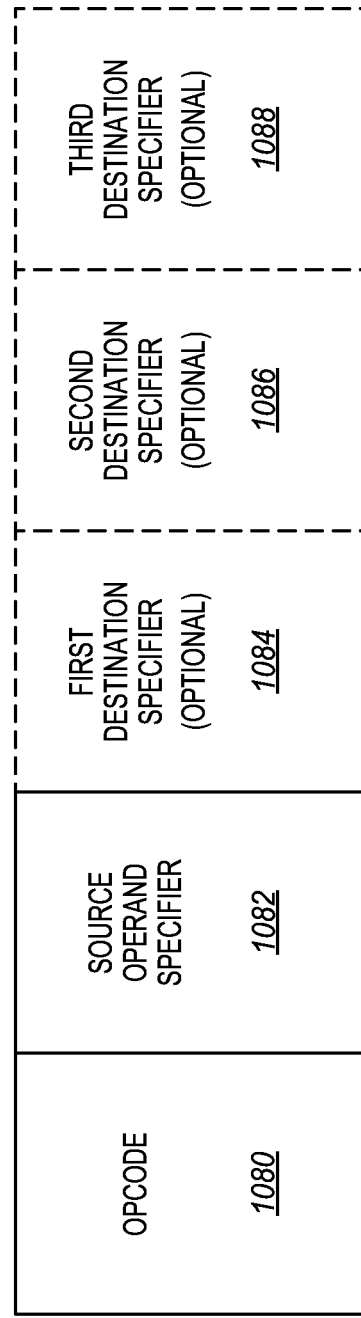
FIG. 10 is a block diagram of an embodiment of a coordinate conversion instruction.

FIG. 10 is a block diagram of an embodiment of a 3D Morton coordinate conversion instruction 1012. The instruction includes an operation code or opcode 1080. The opcode may represent a plurality of bits or one or more fields that are operable to identify the instruction and/or the operation to be performed (e.g., to convert 3D Morton coordinates to 3D coordinates).

The instruction also includes a source operand specifier 1082 to explicitly specify a register, memory location, or other storage location used to store a source packed data operand. The instruction also includes a first destination storage location specifier 1084 to explicitly specify a register or other storage location to store a first result packed data operand, an optional second destination storage location specifier 1086 to explicitly specify a register or other storage location to store an optional second result packed data operand, and an optional third destination storage location specifier 1088 to explicitly specify a register or other storage location to store an optional third result packed data operand. By way of example, each of these specifiers may include a set of bits or one or more fields to explicitly specify an address of a register, memory location, or other storage location. Alternatively, a single result packed data operand and single corresponding destination storage location may optionally be used if desired, as previously described. Further, instead of the instruction having explicit specifiers for each of these storage locations, the instruction may optionally have one or more implicit storage locations (e.g., implicit to an opcode of the instruction) for one or more of the source operand and the destination storage locations. For example, it may be implicit to an opcode of the instruction to use a given fixed register for the source operand or one of the destination storage locations so that the given fixed register doesn't need to be explicitly specified. As another example, it may be implicit to reuse the same register or other storage location (e.g., explicitly specified once by the instruction) for both the source operand and as a destination storage location to store one of the result operands (e.g., an implicit source/destination register). In some embodiments, the instruction may have other fields or bits, such as, for example, a bit to indicate a 32-bit or 64-bit execution state or mode. It is to be appreciated that this is just one illustrative example of a suitable 3D Morton coordinate conversion instruction. Alternate embodiments may include a subset of the illustrated fields/specifiers, may add additional fields/specifiers, may overlap certain fields/specifiers, etc. In addition, the illustrated order and arrangement of the fields/specifiers is not required. The fields/specifiers may be rearranged variously. In addition, fields/specifiers need not include contiguous sequences of bits, but rather may include non-contiguous or separated bits. In some embodiments, the instruction format may have a VEX or EVEX encoding or instruction format and attributes as disclosed elsewhere herein, although the scope of the invention is not so limited. Further details on VEX and EVEX encodings and formats are discussed further below.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 11A illustrates an exemplary AVX instruction format including a VEX prefix 1102, real opcode field 1130, Mod R/M byte 1140, SIB byte 1150, displacement field 1162, and IMM8 1172. FIG. 11B illustrates which fields from FIG. 11A make up a full opcode field 1174 and a base operation field 1142. FIG. 11C illustrates which fields from FIG. 11A make up a register index field 1144.

VEX Prefix (Bytes 0-2) 1102 is encoded in a three-byte form. The first byte is the Format Field 1140 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1105 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1115 (VEX byte 1, bits [4:0]-mmmmm) includes content to encode an implied leading opcode byte. W Field 1164 (VEX byte 2, bit [7]-W)—is represented by the notation VEX.W, and provides different functions depending on the instruction. The role of VEX.vvvv 1120 (VEX Byte 2, bits [6:3]-vvvv) may include the following: 1) VEX.vvvv encodes the first source register operand, specified in inverted (1 s complement) form and is valid for instructions with 2 or more source operands; 2) VEX.vvvv encodes the destination register operand, specified in 1 s complement form for certain vector shifts; or 3) VEX.vvvv does not encode any operand, the field is reserved and should contain 1111b. If VEX.L 1168 Size field (VEX byte 2, bit [2]-L)=0, it indicates 128 bit vector; if VEX.L=1, it indicates 256 bit vector. Prefix encoding field 1125 (VEX byte 2, bits [1:0]-pp) provides additional bits for the base operation field.

Real Opcode Field 1130 (Byte 3) is also known as the opcode byte. Part of the opcode is specified in this field.

MOD R/M Field 1140 (Byte 4) includes MOD field 1142 (bits [7-6]), Reg field 1144 (bits [5-3]), and R/M field 1146 (bits [2-0]). The role of Reg field 1144 may include the following: encoding either the destination register operand or a source register operand (the rrr of Rrrr), or be treated as an opcode extension and not used to encode any instruction operand. The role of R/M field 1146 may include the following: encoding the instruction operand that references a memory address, or encoding either the destination register operand or a source register operand.

Scale, Index, Base (SIB)—The content of Scale field 1150 (Byte 5) includes SS1152 (bits [7-6]), which is used for memory address generation. The contents of SIB.xxx 1154 (bits [5-3]) and SIB.bbb 1156 (bits [2-0]) have been previously referred to with regard to the register indexes Xxxx and Bbbb.

The Displacement Field 1162 and the immediate field (IMM8) 1172 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 12A:
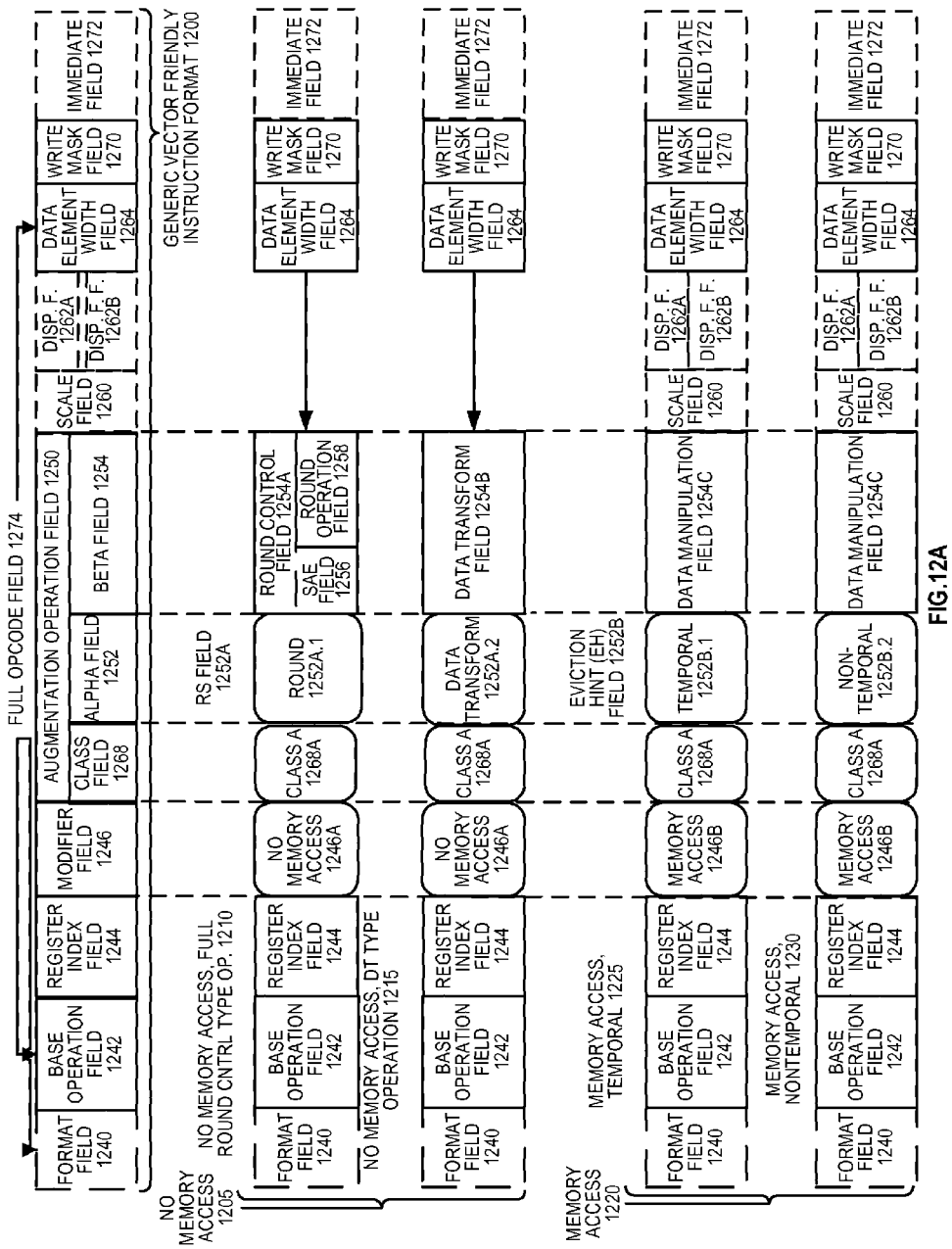
FIG. 12A-B is a block diagram illustrating an exemplary specific vector friendly instruction format and an opcode field, according to embodiments of the invention.
Figure 12B:
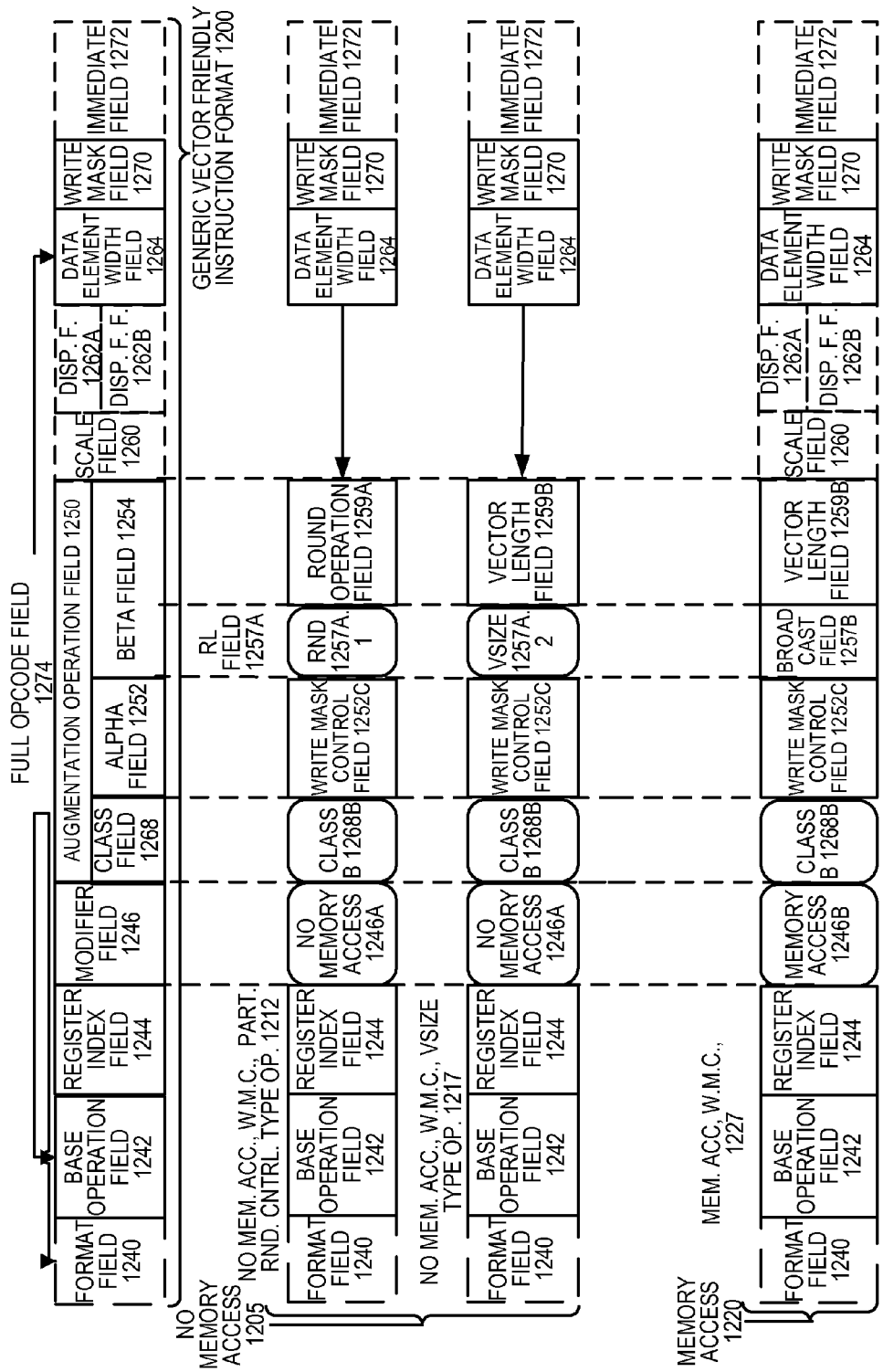

FIGS. 12A-12B are block diagrams illustrating a generic vector friendly instruction format and instruction templates thereof according to embodiments of the invention. FIG. 12A is a block diagram illustrating a generic vector friendly instruction format and class A instruction templates thereof according to embodiments of the invention; while FIG. 12B is a block diagram illustrating the generic vector friendly instruction format and class B instruction templates thereof according to embodiments of the invention. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control, partial round control type operation 1212 instruction template and a no memory access, write mask control, vsize type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access from those that do not; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1250—its content distinguishes which one of a variety of different operations to be performed in addition to the base operation. This field is context specific. In one embodiment of the invention, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses $2^{scale}*\text{index}+\text{base}$).

Displacement Field 1262A—its content is used as part of memory address generation (e.g., for address generation that uses $2^{scale}*\text{index}+\text{base}+\text{displacement}$).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described later herein) and the data manipulation field 1254C. The displacement field 1262A and the displacement factor field 1262B are optional in the sense that they are not used for the no memory access 1205 instruction templates and/or different embodiments may implement only one or none of the two.

Data element width field 1264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While embodiments of the invention are described in which the write mask field's 1270 content selects one of a number of write mask registers that contains the write mask to be used (and thus the write mask field's 1270 content indirectly identifies that masking to be performed), alternative embodiments instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate and it is not present in instructions that do not use an immediate.

Class field 1268—its content distinguishes between different classes of instructions. With reference to FIGS. 12A-B, the contents of this field select between class A and class B instructions. In FIGS. 12A-B, rounded corner squares are used to indicate a specific value is present in a field (e.g., class A 1268A and class B 1268B for the class field 1268 respectively in FIGS. 12A-B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale filed 1262B are not present.

No-Memory Access Instruction Templates—Full Round Control Type Operation

In the no memory access full round control type operation 1210 instruction template, the beta field 1254 is interpreted as a round control field 1254A, whose content(s) provide static rounding. While in the described embodiments of the invention the round control field 1254A includes a suppress all floating point exceptions (SAE) field 1256 and a round operation control field 1258, alternative embodiments may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates suppression is enabled, a given instruction does not report any kind of floating-point exception flag and does not raise any floating point exception handler.

Round operation control field 1258—its content distinguishes which one of a group of rounding operations to perform (e.g., Round-up, Round-down, Round-towards-zero and Round-to-nearest). Thus, the round operation control field 1258 allows for the changing of the rounding mode on a per instruction basis. In one embodiment of the invention where a processor includes a control register for specifying rounding modes, the round operation control field's 1250 content overrides that register value.

No Memory Access Instruction Templates—Data Transform Type Operation

In the no memory access data transform type operation 1215 instruction template, the beta field 1254 is interpreted as a data transform field 1254B, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z) field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control, VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale filed 1262B are not present.

In the no memory access, write mask control, partial round control type operation 1210 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A—just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In one embodiment of the invention where a processor includes a control register for specifying rounding modes, the round operation control field's 1250 content overrides that register value.

In the no memory access, write mask control, VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one embodiment is shown where the full opcode field 1274 includes all of these fields, the full opcode field 1274 includes less than all of these fields in embodiments that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 13 is a block diagram illustrating an exemplary specific vector friendly instruction format according to embodiments of the invention. FIG. 13 shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12 into which the fields from FIG. 13 map are illustrated.

It should be understood that, although embodiments of the invention are described with reference to the specific vector friendly instruction format 1300 in the context of the generic vector friendly instruction format 1200 for illustrative purposes, the invention is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the invention is not so limited (that is, the generic vector friendly instruction format 1200 contemplates other sizes of the data element width field 1264).

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits [7:0])—the first byte (EVEX Byte 0) is the format field 1240 and it contains 0x62 (the unique value used for distinguishing the vector friendly instruction format in one embodiment of the invention).

The second-fourth bytes (EVEX Bytes 1-3) include a number of bit fields providing specific capability.

REX field 1305 (EVEX Byte 1, bits [7-5])—consists of a EVEX.R bit field (EVEX Byte 1, bit [7]-R), EVEX.X bit field (EVEX byte 1, bit [6]-X), and 1257BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]-mmmm)—its content encodes an implied leading opcode byte (0F, 0F 38, or 0F 3).

Data element width field 1264 (EVEX byte 2, bit [7]-W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]-vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (1 s complement) form. Depending on the instruction, an extra different EVEX bit field is used to extend the specifier size to 32 registers.

EVEX.U 1268 Class field (EVEX byte 2, bit [2]-U)—If EVEX.U=0, it indicates class A or EVEX.U0; if EVEX.U=1, it indicates class B or EVEX.U1.

Prefix encoding field 1325 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1252 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1254 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1270 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following: encoding the instruction operand that references a memory address, or encoding either the destination register operand or a source register operand.

Scale, Index, Base (SIB) Byte (Byte 6)—As previously described, the scale field's 1250 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1272 operates as previously described.

Full Opcode Field

FIG. 13B is a block diagram illustrating the fields of the specific vector friendly instruction format 1300 that make up the full opcode field 1274 according to one embodiment of the invention. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.

Register Index Field

FIG. 13C is a block diagram illustrating the fields of the specific vector friendly instruction format 1300 that make up the register index field 1244 according to one embodiment of the invention. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
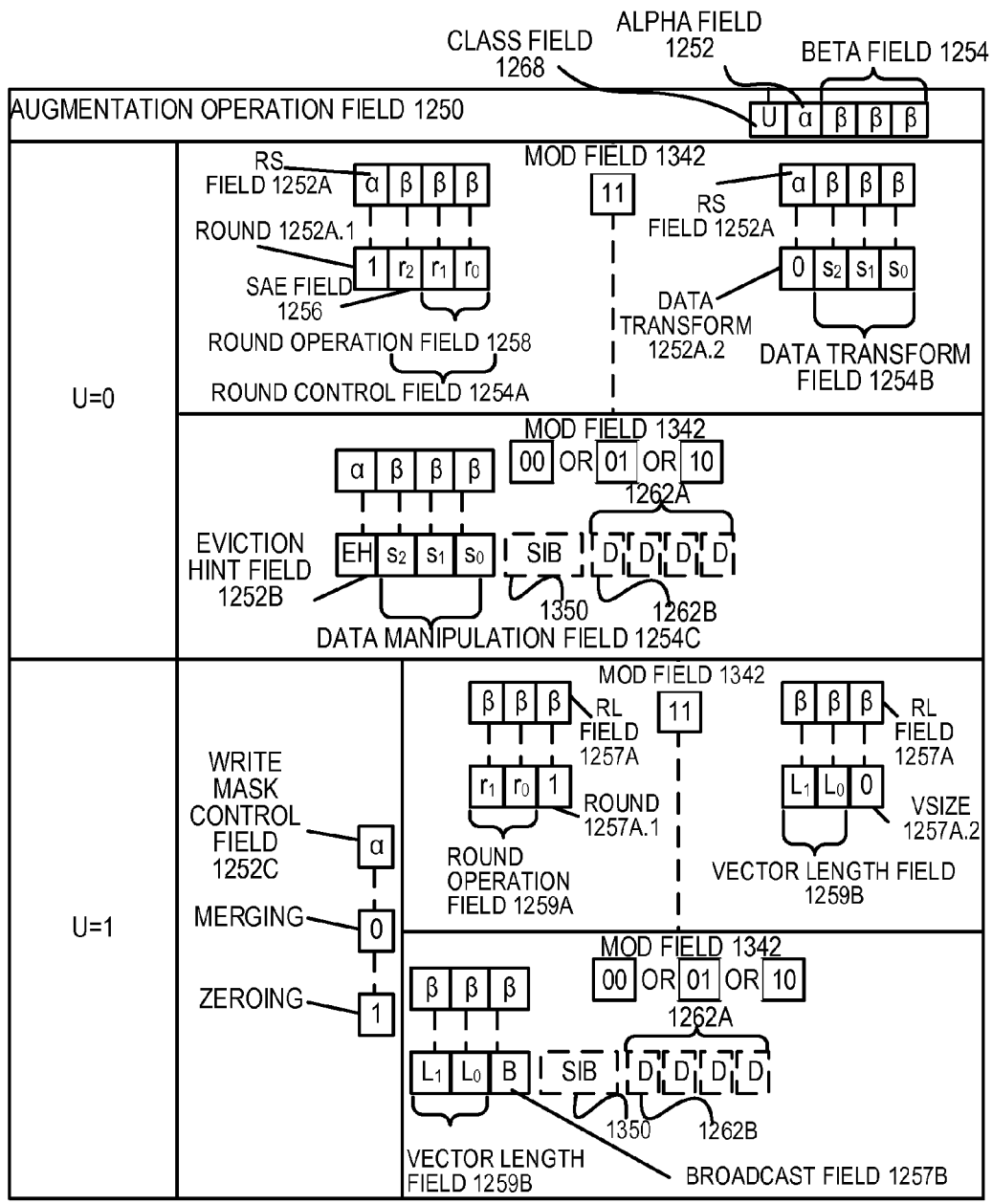

FIG. 13D is a block diagram illustrating the fields of the specific vector friendly instruction format 1300 that make up the augmentation operation field 1250 according to one embodiment of the invention. When the class (U) field 1268 contains 0, it signifies EVEX.U0 (class A 1268A); when it contains 1, it signifies EVEX.U1 (class B 1268B). When U=0 and the MOD field 1342 contains 11 (signifying a no memory access operation), the alpha field 1252 (EVEX byte 3, bit [7]-EH) is interpreted as the rs field 1252A. When the rs field 1252A contains a 1 (round 1252A.1), the beta field 1254 (EVEX byte 3, bits [6:4]-SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]-SSS) is interpreted as a three bit data transform field 1254B. When U=0 and the MOD field 1342 contains 00, 01, or 10 (signifying a memory access operation), the alpha field 1252 (EVEX byte 3, bit [7]-EH) is interpreted as the eviction hint (EH) field 1252B and the beta field 1254 (EVEX byte 3, bits [6:4]-SSS) is interpreted as a three bit data manipulation field 1254C.

When U=1, the alpha field 1252 (EVEX byte 3, bit [7]-EH) is interpreted as the write mask control (Z) field 1252C. When U=1 and the MOD field 1342 contains 11 (signifying a no memory access operation), part of the beta field 1254 (EVEX byte 3, bit [4]-$S_0$) is interpreted as the RL field 1257A; when it contains a 1 (round 1257A.1) the rest of the beta field 1254 (EVEX byte 3, bit [6-5]-$S_{2-1}$) is interpreted as the round operation field 1259A, while when the RL field 1257A contains a 0 (VSIZE 1257.A2) the rest of the beta field 1254 (EVEX byte 3, bit [6-5]-$S_{2-1}$) is interpreted as the vector length field 1259B (EVEX byte 3, bit [6-5]-$L_{1-0}$). When U=1 and the MOD field 1342 contains 00, 01, or 10 (signifying a memory access operation), the beta field 1254 (EVEX byte 3, bits [6:4]-SSS) is interpreted as the vector length field 1259B (EVEX byte 3, bit [6-5]-$L_{1-0}$) and the broadcast field 1257B (EVEX byte 3, bit [4]-B).

Exemplary Register Architecture

Figure 14:
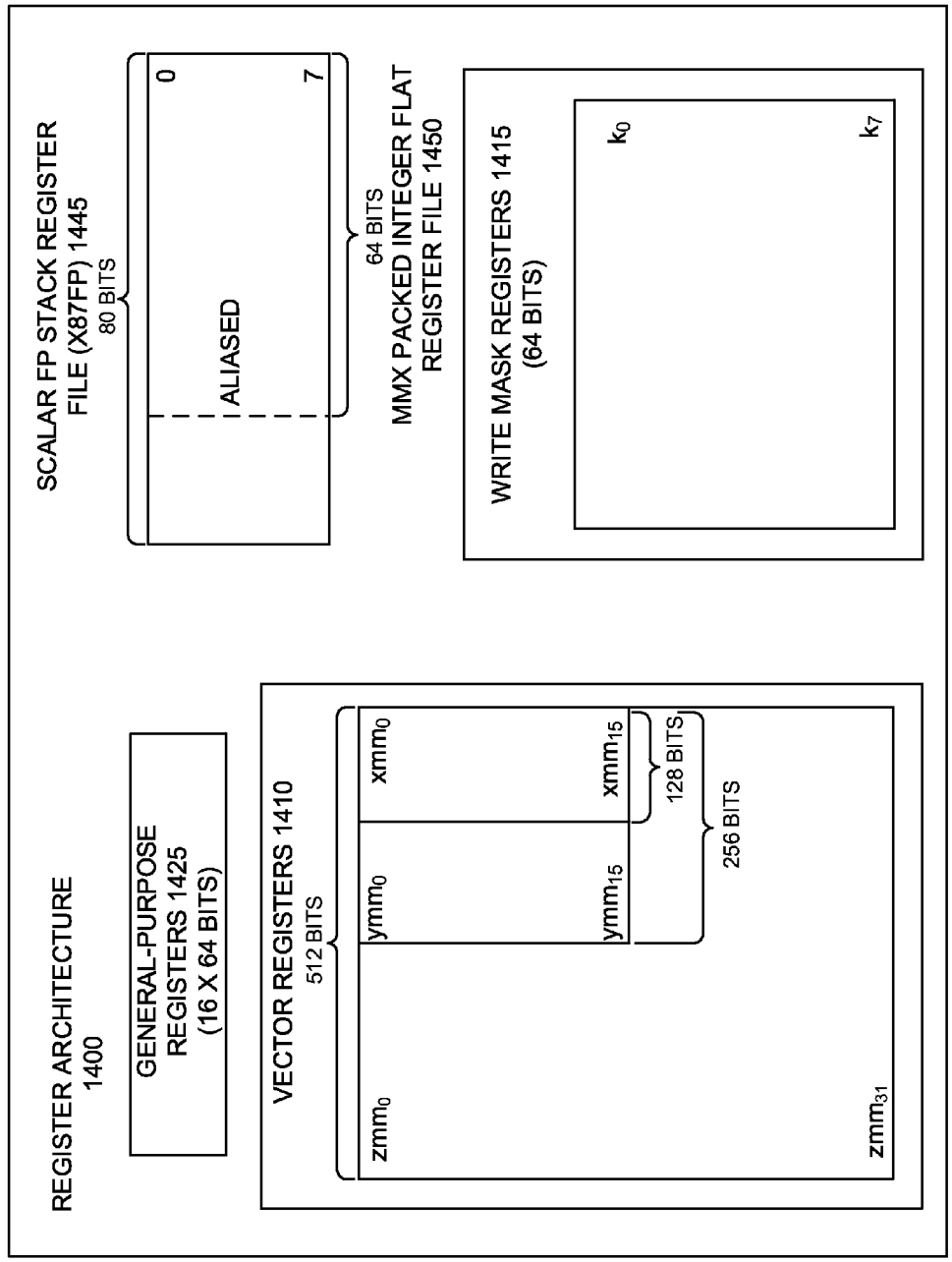
FIG. 14 is a block diagram of an embodiment of a register architecture.

FIG. 14 is a block diagram of a register architecture 1400 according to one embodiment of the invention. In the embodiment illustrated, there are 32 vector registers 1410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
|---|---|---|---|
| Instruction Templates that do not include the vector length field 1259B | A (FIG. 12A; U = 0) | 1210, 1215, 1225, 1230 | zmm registers (the vector length is 64 byte) |
| | B (FIG. 12B; U = 1) | 1212 | zmm registers (the vector length is 64 byte) |
| Instruction templates that do include the vector length field 1259B | B (FIG. 12B; U = 1) | 1217, 1227 | zmm, ymm, or xmm registers (the vector length is 64 byte, 32 byte, or 16 byte) depending on the vector length field 1259B |

In other words, the vector length field 1259B selects between a maximum length and one or more other shorter lengths, where each such shorter length is half the length of the preceding length; and instructions templates without the vector length field 1259B operate on the maximum vector length. Further, in one embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1415—in the embodiment illustrated, there are 8 write mask registers (k0 through k7), each 64 bits in size. In an alternate embodiment, the write mask registers 1415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 15A is a block diagram illustrating both an exemplary in-order pipeline and an exemplary register renaming, out-of-order issue/execution pipeline according to embodiments of the invention. FIG. 15B is a block diagram illustrating both an exemplary embodiment of an in-order architecture core and an exemplary register renaming, out-of-order issue/execution architecture core to be included in a processor according to embodiments of the invention. The solid lined boxes in FIGS. 15A-B illustrate the in-order pipeline and in-order core, while the optional addition of the dashed lined boxes illustrates the register renaming, out-oforder issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 16B:
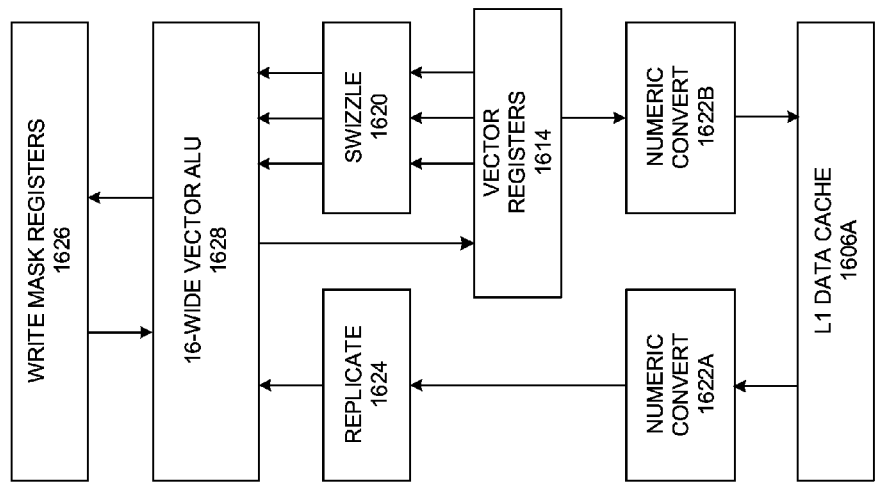
FIG. 16B is a block diagram of an embodiment of an expanded view of part of the processor core of FIG. 16A.
Figure 16A:
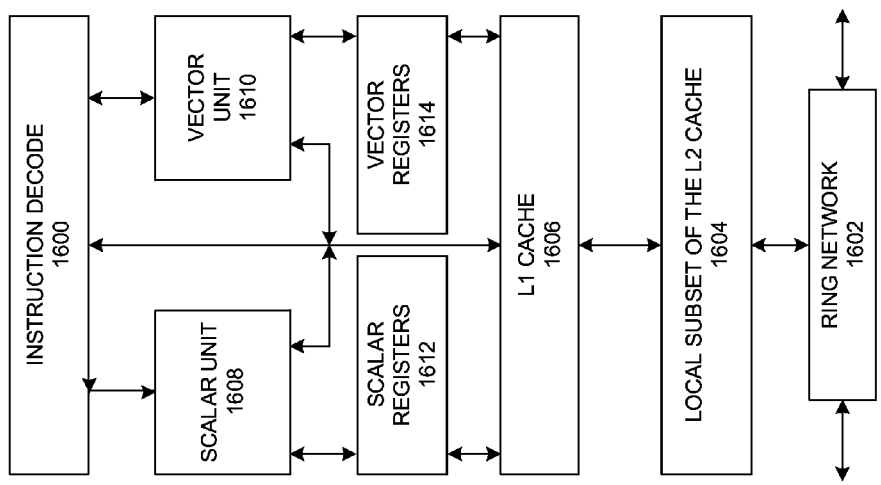
FIG. 16A is a block diagram of an embodiment of a single processor core, along with its connection to the on-die interconnect network, and with its local subset of the Level 2 (L2) cache.

FIGS. 16A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1602 and with its local subset of the Level 2 (L2) cache 1604, according to embodiments of the invention. In one embodiment, an instruction decoder 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative embodiments of the invention may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 16B is an expanded view of part of the processor core in FIG. 16A according to embodiments of the invention. FIG. 16B includes an L1 data cache 1606A part of the L1 cache 1604, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B, and replication with replication unit 1624 on the memory input. Write mask registers 1626 allow predicating resulting vector writes.

Processor with Integrated Memory Controller and Graphics

Figure 17:
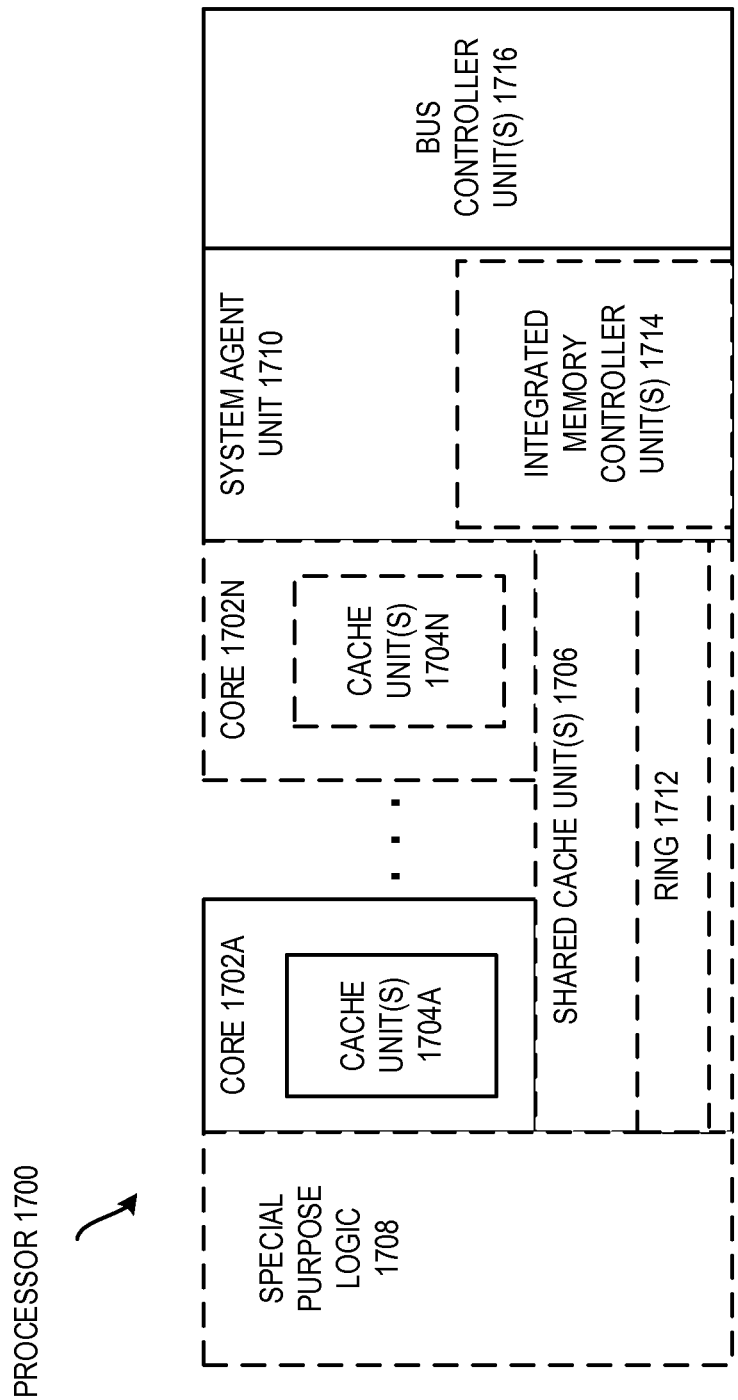
FIG. 17 is a block diagram of an embodiment of a processor that may have more than one core, may have an integrated memory controller, and may have integrated graphics.

FIG. 17 is a block diagram of a processor 1700 that may have more than one core, may have an integrated memory controller, and may have integrated graphics according to embodiments of the invention. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the integrated graphics logic 1708, the set of shared cache units 1706, and the system agent unit 1710/integrated memory controller unit(s) 1714, alternative embodiments may use any number of well-known techniques for interconnecting such units. In one embodiment, coherency is maintained between one or more cache units 1706 and cores 1702-A-N.

In some embodiments, one or more of the cores 1702A-N are capable of multi-threading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Exemplary Computer Architectures

FIGS. 18-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
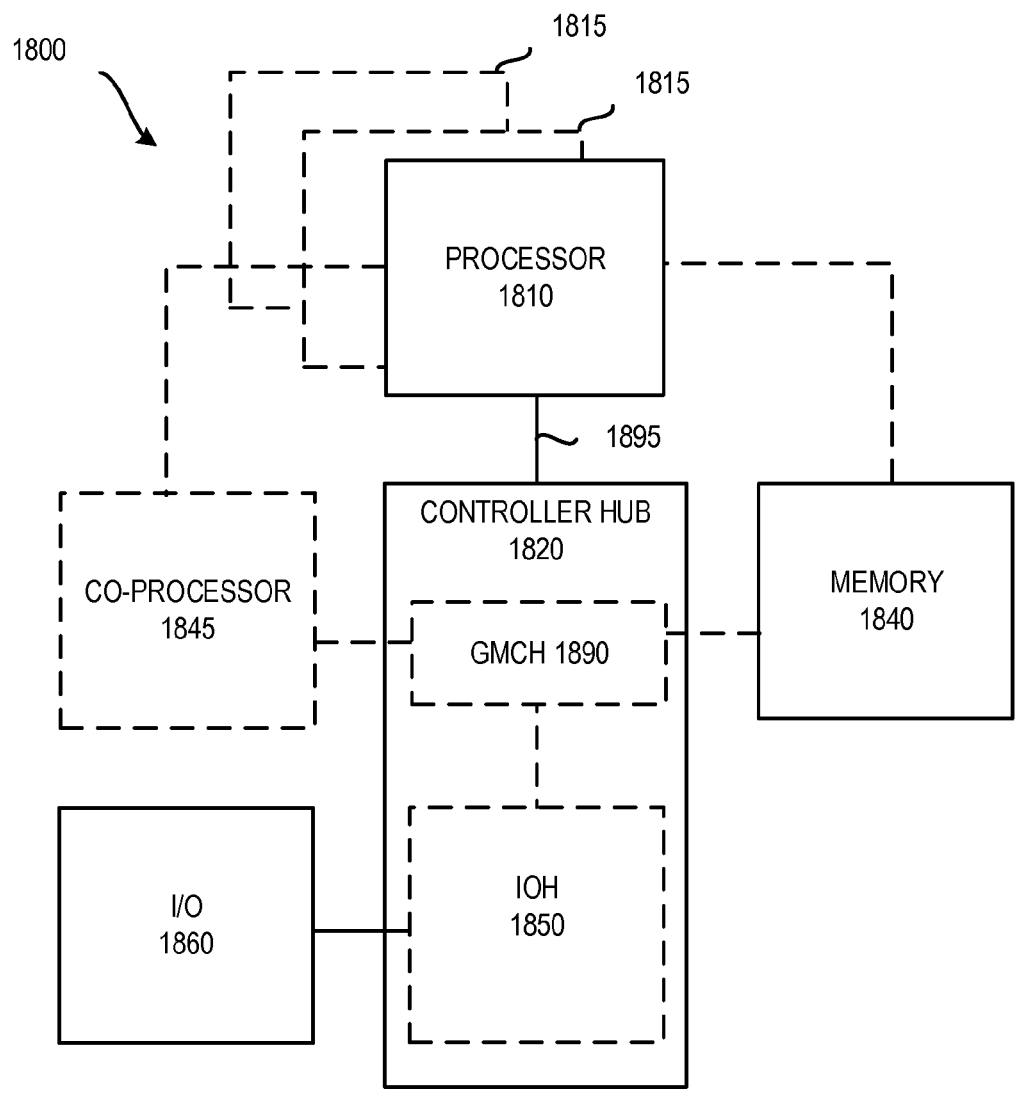
FIG. 18 is a block diagram of a first embodiment of a computer architecture.

Referring now to FIG. 18, shown is a block diagram of a system 1800 in accordance with one embodiment of the present invention. The system 1800 may include one or more processors 1810, 1815, which are coupled to a controller hub 1820. In one embodiment the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 is couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface such as QuickPath Interconnect (QPI), or similar connection 1895.

In one embodiment, the coprocessor 1845 is a special-purpose processor, such as, for example, a high-throughput MIC processor, a network or communication processor, compression engine, graphics processor, GPGPU, embedded processor, or the like. In one embodiment, controller hub 1820 may include an integrated graphics accelerator.

There can be a variety of differences between the physical resources 1810, 1815 in terms of a spectrum of metrics of merit including architectural, microarchitectural, thermal, power consumption characteristics, and the like.

In one embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
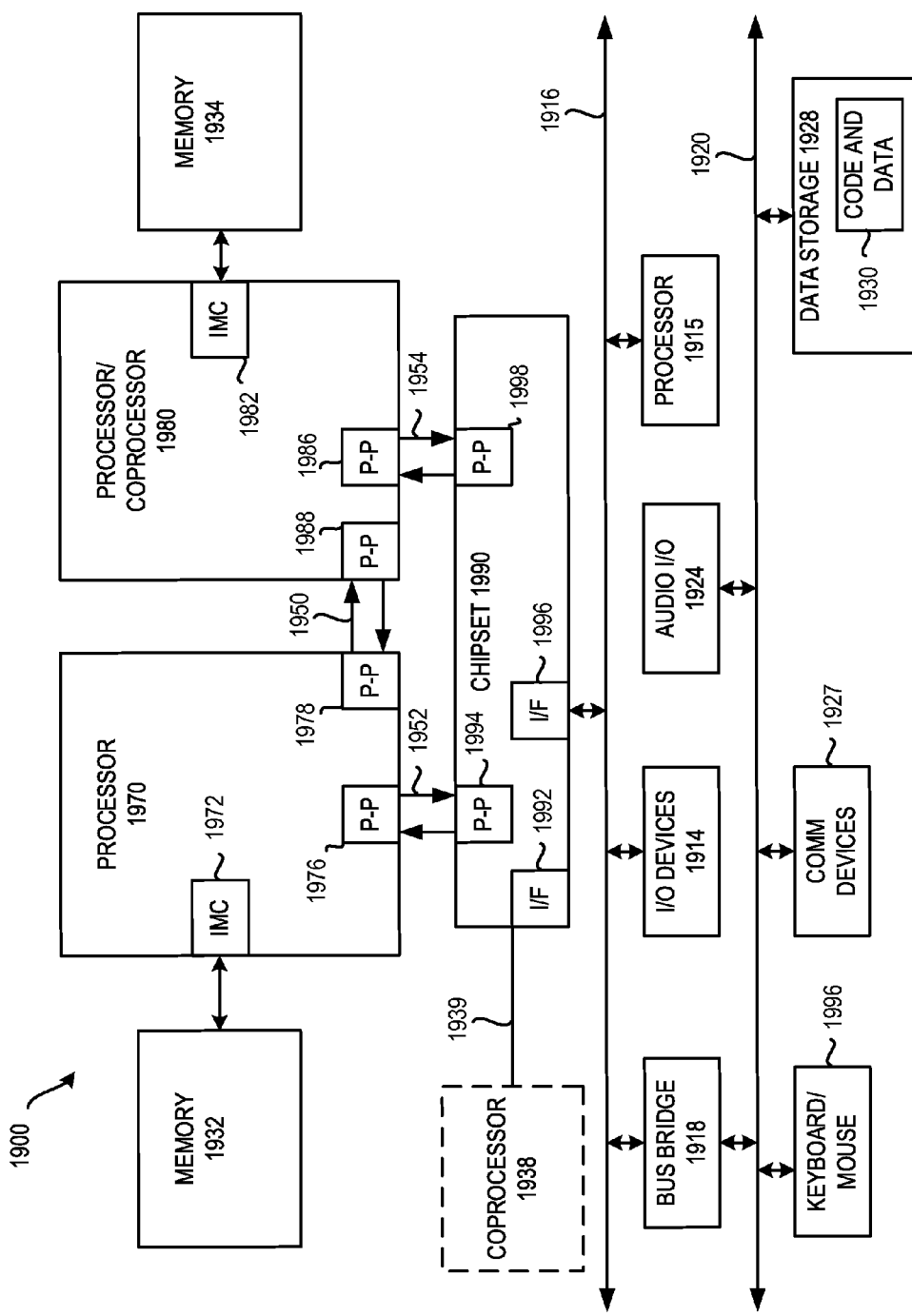
FIG. 19 is a block diagram of a second embodiment of a computer architecture.

Referring now to FIG. 19, shown is a block diagram of a first more specific exemplary system 1900 in accordance with an embodiment of the present invention. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one embodiment of the invention, processors 1970 and 1980 are respectively processors 1810 and 1815, while coprocessor 1938 is coprocessor 1845. In another embodiment, processors 1970 and 1980 are respectively processor 1810 coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1939. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 may be coupled to first bus 1916, along with a bus bridge 1918 which couples first bus 1916 to a second bus 1920. In one embodiment, one or more additional processor(s) 1915, such as coprocessors, high-throughput MIC processors, GPGPU's, accelerators (such as, e.g., graphics accelerators or digital signal processing (DSP) units), field programmable gate arrays, or any other processor, are coupled to first bus 1916. In one embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in one embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
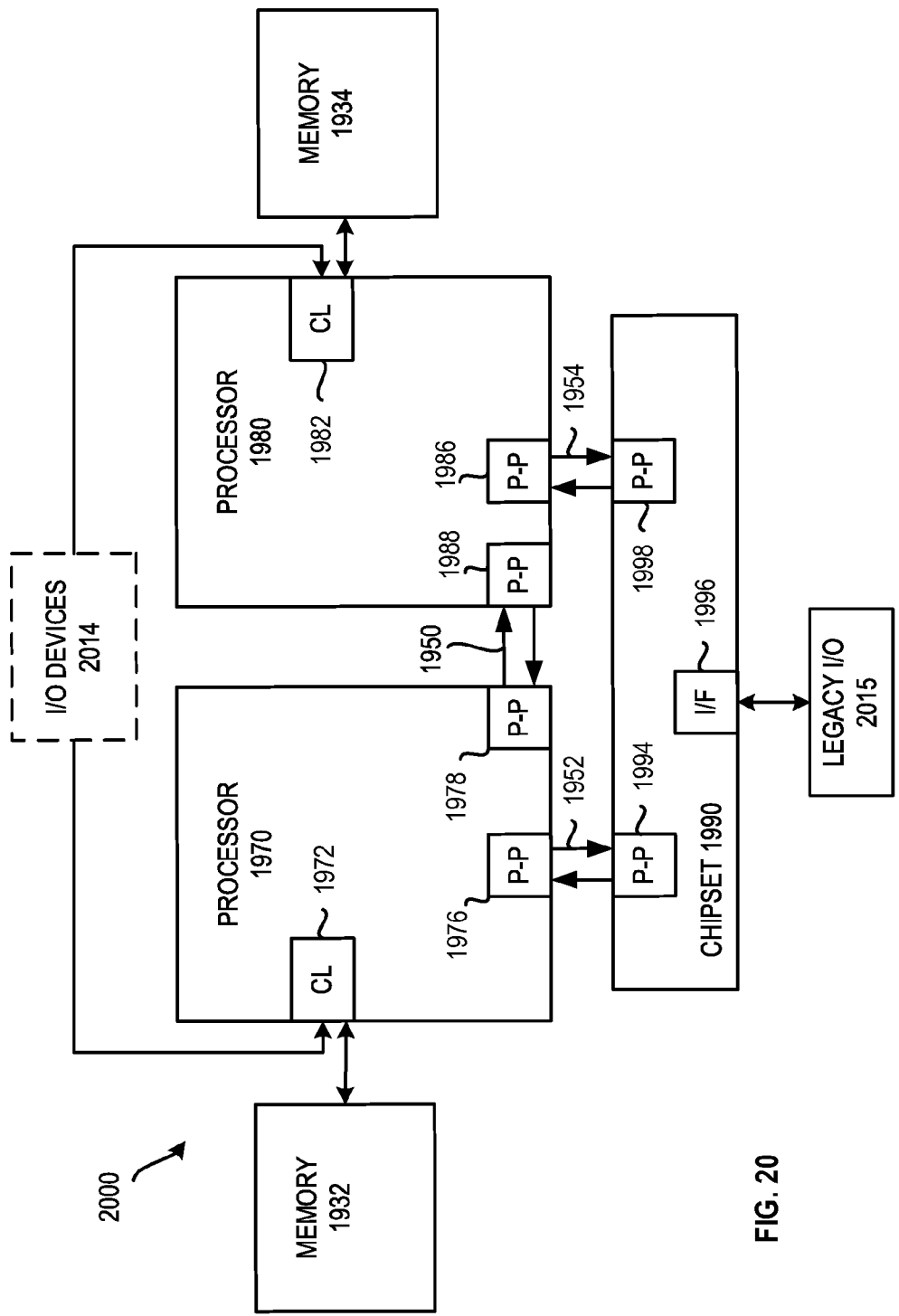
FIG. 20 is a block diagram of a third embodiment of a computer architecture.

Referring now to FIG. 20, shown is a block diagram of a second more specific exemplary system 2000 in accordance with an embodiment of the present invention. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
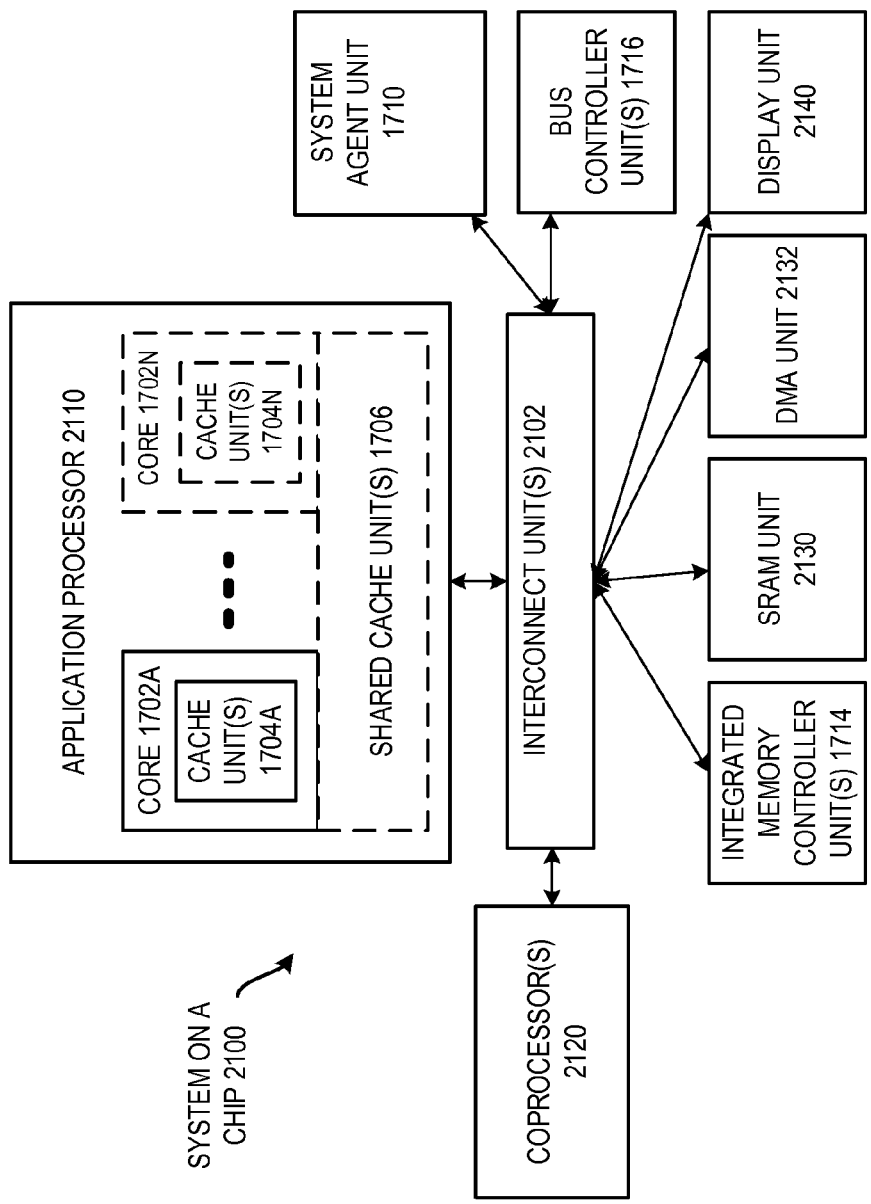
FIG. 21 is a block diagram of a fourth embodiment of a computer architecture.

Referring now to FIG. 21, shown is a block diagram of a SoC 2100 in accordance with an embodiment of the present invention. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 202A-N and shared cache unit(s) 1706; a system agent unit 1710; a bus controller unit(s) 1716; an integrated memory controller unit(s) 1714; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In one embodiment, the coprocessor(s) 2120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
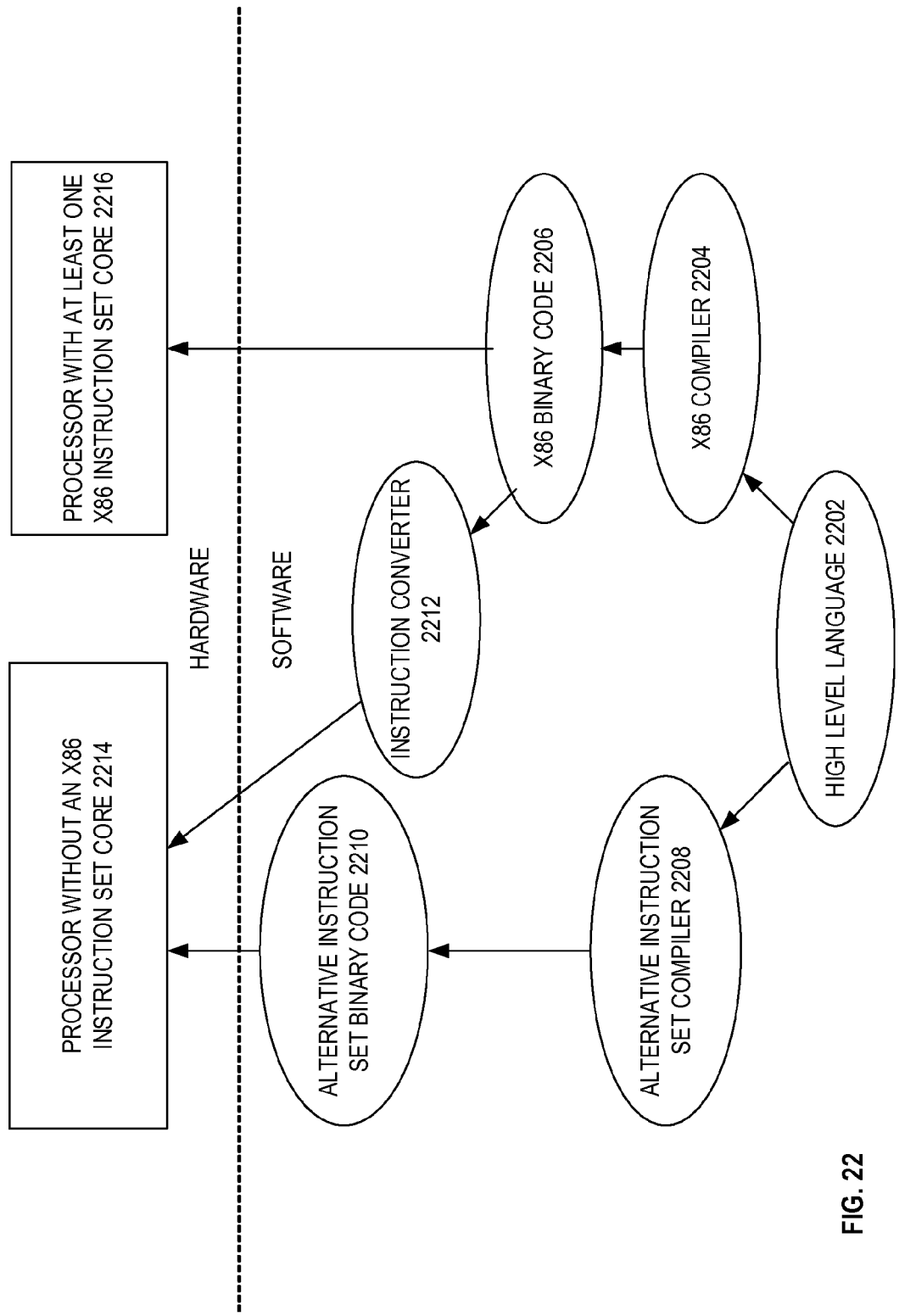
FIG. 22 is a block diagram of use of a software instruction converter to convert binary instructions in a source instruction set to binary instructions in a target instruction set, according to embodiments of the invention.

FIG. 22 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

Components, features, and details described for any of FIGS. 5-10 may also optionally apply to any of FIGS. 3-4. Moreover, components, features, and details described for any of the apparatus may also optionally apply to any of the methods, which in embodiments may be performed by and/or with such apparatus. Any of the processors described herein may be included in any of the systems-on-chips (SoCs) and/or computer systems disclosed herein and/or in other computer systems (e.g., desktops or cell phones) and/or other SoCs. In some embodiments, the computer system may include an interconnect, a processor coupled with the interconnect, and a dynamic random access memory (DRAM) coupled with the interconnect. Alternatively, instead of DRAM, other types of volatile memory that don't need to be refreshed may be used, or flash memory may be used. Examples of other components that may optionally be integrated or included on-die or on-chip with the processor in a SoC include, but are not limited to, a memory controller, memory (e.g., read only memory (ROM), random access memory (RAM), and/or flash memory), a graphics device (e.g., a graphics processing unit (GPU), graphics core, or graphics processor, etc.), a digital signal processor, an image signal processor, a liquid crystal display (LCD) or other display controller, and one or more input and/or output (I/O) controllers to provide control for one or more external interfaces (e.g., universal serial bus (USB), universal asynchronous receiver/transmitter (UART), FireWire, Ethernet, Bluetooth, etc.). SoC for cellular phones may also optionally include a long term evolution (LTE) modem, a sensor engine, and a satellite navigation system controller (e.g., global positioning satellite (GPS), Galileo, and/or Beidou). In some embodiments, the instructions may have features or details of the instruction formats disclosed herein, although this is not required.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, a system-on-chip (SoC), or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, cellular phones (e.g., smartphones), servers, network devices (e.g., routers and switches), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor or other apparatus that includes a plurality of packed data registers, and a decode unit to decode a three-dimensional (3D) Morton coordinate conversion instruction. The 3D Morton coordinate conversion instruction is to indicate a source packed data operand that is to include a plurality of 3D Morton coordinates, and is to indicate one or more destination storage locations. An execution unit is coupled with the packed data registers and the decode unit. The execution unit, in response to the decode unit decoding the 3D Morton coordinate conversion instruction, to store one or more result packed data operands in the one or more destination storage locations. The one or more result packed data operands are to include a plurality of sets of three 3D coordinates. Each of the sets of the three 3D coordinates is to correspond to a different one of the 3D Morton coordinates.

Example 2 includes the processor of Example 1, in which the execution unit, in response to the decode unit decoding the 3D Morton coordinate conversion instruction, is to generate each of the sets of the three 3D coordinates by performing a three-way bitwise de-interleave of bits of the corresponding 3D Morton coordinate into three contiguous strings of bits that each corresponds to a different one of the three 3D coordinates.

Example 3 includes the processor of any one of Examples 1 to 2, in which the execution unit, in response to the decode unit decoding the 3D Morton coordinate conversion instruction, is to store. The execution unit is also to store at least values of bits at positions 0, 3, 6, 9, 12, 15, and 18 of a given 3D Morton coordinate as a first contiguous string of bits, in the one or more result packed data operands, the first contiguous string of bits to correspond to a first 3D coordinate of a given set of three 3D coordinates that corresponds to the given 3D Morton coordinate. The execution unit is also to store at least values of bits at positions 1, 4, 7, 10, 13, 16, and 19 of the given 3D Morton coordinate as a second contiguous string of bits, in the one or more result packed data operands, the second contiguous string of bits to correspond to a second 3D coordinate of the given set of three 3D coordinates. The execution unit is also to store at least values of bits at positions 2, 5, 8, 11, 14, 17, and 20 of the given 3D Morton coordinate as a third contiguous string of bits, in the one or more result packed data operands, the third contiguous string of bits to correspond to a third 3D coordinate of the given set of three 3D coordinates.

Example 4 includes the processor of any one of Examples 1 to 2, in which the execution unit, in response to the decode unit decoding the 3D Morton coordinate conversion instruction, is to store at least values of bits at positions 0, 3, 6, 9, 12, 15, 18, 21, 24, 27, 30, and 33 of a given 3D Morton coordinate as a first contiguous string of bits, in the one or more result packed data operands, the first contiguous string of bits to correspond to a first 3D coordinate of a given set of three 3D coordinates that corresponds to the given 3D Morton coordinate. The execution unit is also to store at least values of bits at positions 1, 4, 7, 10, 13, 16, 19, 22, 25, 28, 31, and 34 of the given 3D Morton coordinate as a second contiguous string of bits, in the one or more result packed data operands, the second contiguous string of bits to correspond to a second 3D coordinate of the given set of three 3D coordinates. The execution unit is also to store at least values of bits at positions 2, 5, 8, 11, 14, 17, 20, 23, 26, 29, 32, and 35 of the given 3D Morton coordinate as a third contiguous string of bits, in the one or more result packed data operands, the third contiguous string of bits to correspond to a third 3D coordinate of the given set of three 3D coordinates.

Example 5 includes the processor of Example 1, in which the execution unit, in response to the decode unit decoding the 3D Morton coordinate conversion instruction, is to store three result packed data operands in three destination storage locations that are to be indicated by the 3D Morton coordinate conversion instruction. The 3D coordinates in each of the result packed data operands are optionally to correspond to a same dimension.

Example 6 includes the processor of Example 5, in which it is optionally to be implicit to the 3D Morton coordinate conversion instruction that a packed data register used to store the source packed data operand is also to be used as one of the three destination storage locations to store one of the result packed data operands.

Example 7 includes the processor of Example 1, in which the execution unit, in response to the decode unit decoding the 3D Morton coordinate conversion instruction, is to store a single result packed data operand in a single destination storage location that is to be indicated by the 3D Morton coordinate conversion instruction. Each set of three 3D coordinates is optionally to be stored in a different data element of the single result packed data operand that is in a same relative position as a data element of the source packed data operand having the corresponding 3D Morton coordinate.

Example 8 includes the processor of Example 1, in which a given 3D Morton coordinate is to be stored in a 32-bit data element in the source packed data operand. Each 3D coordinate in a given set of three 3D coordinates that is to correspond to the given 3D Morton coordinate is optionally to include from seven to ten, or eight to ten, or nine or ten bits.

Example 9 includes the processor of Example 1, in which a given 3D Morton coordinate is to be stored in a 64-bit data element in the source packed data operand. Each 3D coordinate in a given set of three 3D coordinates that is to correspond to the given 3D Morton coordinate is optionally to include from fifteen to twenty-one or from eighteen to twenty-one bits.

Example 10 includes the processor of Example 1, further including an optional branch prediction unit to predict branches, and an optional instruction prefetch unit coupled with the branch prediction unit. The instruction prefetch unit to prefetch instructions including the 4D Morton coordinate conversion instruction. A level 1 (L1) instruction cache is optionally included and coupled with the instruction prefetch unit. The L1 instruction cache to store instructions including the 4D Morton coordinate conversion instruction. An optional L1 data cache may be included to store data. An optional level 2 (L2) cache may be included to store data and instructions including the 4D Morton coordinate conversion instruction. An optional in instruction fetch unit is coupled with the L1 instruction cache and the decode unit to fetch the 4D Morton coordinate conversion instruction from the L1 instruction cache and provide the 4D Morton coordinate conversion instruction to the decode unit. An optional register rename unit is coupled with the packed data registers to rename the packed data registers.

Example 11 is a method in a processor that includes receiving a three-dimensional (3D) Morton coordinate conversion instruction. The 3D Morton coordinate conversion instruction indicating a source packed data operand that includes a plurality of 3D Morton coordinates, and indicating one or more destination storage locations. The method also includes storing one or more result packed data operands in the one or more destination storage locations. The one or more result packed data operands including a plurality of sets of three 3D coordinates. Each of the sets of the three-dimensional coordinates corresponds to a different one of the three-dimensional Morton coordinates.

Example 12 includes the method of Example 11, further including generating each of the sets of the three 3D coordinates by performing a three-way bitwise de-interleave of bits of the corresponding 3D Morton coordinate into three contiguous strings of bits that each corresponds to a different one of the three 3D coordinates.

Example 13 includes the method of Example 11, in which storing the one or more result packed data operands optionally includes storing three result packed data operands in three destination storage locations indicated by the 3D Morton coordinate conversion instruction. The 3D coordinates in each of the result packed data operands optionally all correspond to a same dimension.

Example 14 includes the method of Example 11, in which storing the one or more result packed data operands optionally includes storing a single result packed data operand in a single destination storage location indicated by the 3D Morton coordinate conversion instruction. Each set of three 3D coordinates is optionally in a different data element of the single result packed data operand in a same relative position as a data element of the source packed data operand having the corresponding 3D Morton coordinate.

Example 15 includes the method of Example 11, further including receiving the source packed data operand having a given 3D Morton coordinate stored in a 32-bit data element. Also, optionally storing includes storing a given set of three 3D coordinates that corresponds to the given 3D Morton coordinate in which each 3D coordinate in includes from seven to ten bits.

Example 16 includes the method of Example 11, in which storing the one or more result packed data operands includes storing at least values of bits at positions 0, 3, 6, 9, 12, 15, and 18 of a given 3D Morton coordinate as a first contiguous string of bits, in the one or more result packed data operands, the first contiguous string of bits to correspond to a first 3D coordinate of a given set of three 3D coordinates that corresponds to the given 3D Morton coordinate. Also, optionally storing at least values of bits at positions 1, 4, 7, 10, 13, 16, and 19 of the given 3D Morton coordinate as a second contiguous string of bits, in the one or more result packed data operands, the second contiguous string of bits to correspond to a second 3D coordinate of the given set of three 3D coordinates. Also, optionally storing at least values of bits at positions 2, 5, 8, 11, 14, 17, and 20 of the given 3D Morton coordinate as a third contiguous string of bits, in the one or more result packed data operands, the third contiguous string of bits to correspond to a third 3D coordinate of the given set of three 3D coordinates.

Example 17 includes the method of Example 11, further including receiving the source packed data operand having a given 3D Morton coordinate stored in a 64-bit data element. The method also includes storing a given set of three 3D coordinates that corresponds to the given 3D Morton coordinate in which each 3D coordinate in includes from fifteen to twenty-one bits.

Example 18 includes the method of Example 11, in which storing the one or more result packed data operands includes storing at least values of bits at positions 0, 3, 6, 9, 12, 15, 18, 21, 24, 27, 30, and 33 of a given 3D Morton coordinate as a first contiguous string of bits, in the one or more result packed data operands, the first contiguous string of bits to correspond to a first 3D coordinate of a given set of three 3D coordinates that corresponds to the given 3D Morton coordinate. Also, optionally storing at least values of bits at positions 1, 4, 7, 10, 13, 16, 19, 22, 25, 28, 31, and 34 of the given 3D Morton coordinate as a second contiguous string of bits, in the one or more result packed data operands, the second contiguous string of bits to correspond to a second 3D coordinate of the given set of three 3D coordinates. Also, optionally storing at least values of bits at positions 2, 5, 8, 11, 14, 17, 20, 23, 26, 29, 32, and 35 of the given 3D Morton coordinate as a third contiguous string of bits, in the one or more result packed data operands, the third contiguous string of bits to correspond to a third 3D coordinate of the given set of three 3D coordinates.

Example 19 is a system to process instructions that includes an interconnect, and a processor coupled with the interconnect. The processor to receive an instruction that is to indicate a source packed data operand that is to include a plurality of data elements, and that is to indicate one or more destination storage locations. The processor, in response to the instruction, to store one or more result packed data operands in the one or more destination storage locations. The one or more result packed data operands are include a corresponding set of three strings of bits for each data element in the source packed data operand. Each set of three strings of bits is to include a first string of bits, a second string of bits, and a third string of bits. Each first string of bits is to include at least values of bits at positions 0, 3, 6, 9, 12, 15, and 18 of the corresponding data element of the source packed data operand. Each second string of bits is to include at least values of bits at positions 1, 4, 7, 10, 13, 16, and 19 of the corresponding data element of the source packed data operand. Each third string of bits is to include at least values of bits at positions 2, 5, 8, 11, 14, 17, and 20 of the corresponding data element of the source packed data operand. The system also includes an optional dynamic random access memory (DRAM) coupled with the interconnect.

Example 20 includes the system of Example 19, in which the processor, in response to the instruction, is to store three result packed data operands in three destination storage locations, in which one of the three result packed data operands is to store all of the first strings of bits.

Example 21 is an article of manufacture that includes a non-transitory machine-readable storage medium. The non-transitory machine-readable storage medium storing an instruction. The instruction is to indicate a source packed data operand that is to include a plurality of data elements, and is to indicate one or more destination storage locations. The instruction if executed by a machine is to cause the machine to perform operations including storing one or more result packed data operands in the one or more destination storage locations. The one or more result packed data operands are to include a corresponding set of three strings of bits for each data element in the source packed data operand. Each set of three strings of bits is to include a first string of bits, a second string of bits, and a third string of bits. Each first string of bits is to include at least values of bits at positions 0, 3, 6, 9, 12, 15, and 18 of the corresponding data element of the source packed data operand. Each second string of bits is to include at least values of bits at positions 1, 4, 7, 10, 13, 16, and 19 of the corresponding data element of the source packed data operand. Each third string of bits is to include at least values of bits at positions 2, 5, 8, 11, 14, 17, and 20 of the corresponding data element of the source packed data operand.

Example 22 includes the article of manufacture of Example 21, in which the processor, in response to the instruction, is to store a single result packed data operand in a single destination storage location.

Example 23 is a processor or other apparatus that is operative to perform the method of any one of Examples 11 to 18.

Example 24 is a processor or other apparatus that includes means for performing the method of any one of Examples 11 to 18.

Example 25 is a processor or other apparatus that includes any combination of modules and/or units and/or logic and/or circuitry and/or means for performing the method of any one of Examples 11 to 18.

Example 26 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 11 to 18.

Example 27 is a processor or other apparatus substantially as described herein.

Example 28 is a processor or other apparatus that is operative to perform any method substantially as described herein.

What is claimed is:

1. A processor comprising:
    a plurality of packed data registers;
    a decode unit to decode a three-dimensional (3D) Morton coordinate conversion instruction, the 3D Morton coordinate conversion instruction to indicate a source packed data operand that is to include a plurality of 3D Morton coordinates, and to indicate one or more destination storage locations; and
    an execution unit coupled with the packed data registers and coupled with the decode unit, the execution unit, in response to the decode of the 3D Morton coordinate conversion instruction, to store one or more result packed data operands in the one or more destination storage locations, wherein the one or more result packed data operands are to include a plurality of sets of three 3D coordinates, wherein each of the sets of the three 3D coordinates is to correspond to a different one of the 3D Morton coordinates.

2. The processor of claim 1, wherein the execution unit, in response to the decode of the 3D Morton coordinate conversion instruction, is to generate each of the sets of the three 3D coordinates by performing a three-way bitwise de-interleave of bits of the corresponding 3D Morton coordinate into three contiguous strings of bits that are each to correspond to a different one of the three 3D coordinates.

3. The processor of claim 1, wherein the execution unit, in response to the decode of the 3D Morton coordinate conversion instruction, is to store:
    at least values of bits at positions 0, 3, 6, 9, 12, 15, and 18 of a given 3D Morton coordinate as a first contiguous string of bits, in the one or more result packed data operands, the first contiguous string of bits to correspond to a first 3D coordinate of a given set of three 3D coordinates that corresponds to the given 3D Morton coordinate;
    at least values of bits at positions 1, 4, 7, 10, 13, 16, and 19 of the given 3D Morton coordinate as a second contiguous string of bits, in the one or more result packed data operands, the second contiguous string of bits to correspond to a second 3D coordinate of the given set of three 3D coordinates; and
    at least values of bits at positions 2, 5, 8, 11, 14, 17, and 20 of the given 3D Morton coordinate as a third contiguous string of bits, in the one or more result packed data operands, the third contiguous string of bits to correspond to a third 3D coordinate of the given set of three 3D coordinates.

4. The processor of claim 1, wherein the execution unit, in response to the decode of the 3D Morton coordinate conversion instruction, is to store:
    at least values of bits at positions 0, 3, 6, 9, 12, 15, 18, 21, 24, 27, 30, and 33 of a given 3D Morton coordinate as a first contiguous string of bits, in the one or more result packed data operands, the first contiguous string of bits to correspond to a first 3D coordinate of a given set of three 3D coordinates that corresponds to the given 3D Morton coordinate;
    at least values of bits at positions 1, 4, 7, 10, 13, 16, 19, 22, 25, 28, 31, and 34 of the given 3D Morton coordinate as a second contiguous string of bits, in the one or more result packed data operands, the second contiguous string of bits to correspond to a second 3D coordinate of the given set of three 3D coordinates; and
    at least values of bits at positions 2, 5, 8, 11, 14, 17, 20, 23, 26, 29, 32, and 35 of the given 3D Morton coordinate as a third contiguous string of bits, in the one or more result packed data operands, the third contiguous string of bits to correspond to a third 3D coordinate of the given set of three 3D coordinates.

5. The processor of claim 1, wherein the execution unit, in response to the decode of the 3D Morton coordinate conversion instruction, is to store three result packed data operands in three destination storage locations that are to be indicated by the 3D Morton coordinate conversion instruction, and wherein 3D coordinates in each of the result packed data operands are to correspond to a same dimension.

6. The processor of claim 5, wherein it is to be implicit to the 3D Morton coordinate conversion instruction that a packed data register used to store the source packed data operand is also to be used as one of the three destination storage locations to store one of the result packed data operands.

7. The processor of claim 1, wherein the execution unit, in response to the decode of the 3D Morton coordinate conversion instruction, is to store a single result packed data operand in a single destination storage location that is to be indicated by the 3D Morton coordinate conversion instruction, and wherein each set of three 3D coordinates is to be stored in a different data element of the single result packed data operand that is in a same relative position as a data element of the source packed data operand having the corresponding 3D Morton coordinate.

8. The processor of claim 1, wherein a given 3D Morton coordinate is to be stored in a 32-bit data element in the source packed data operand, and wherein each 3D coordinate in a given set of three 3D coordinates that is to correspond to the given 3D Morton coordinate is to include from seven to ten bits.

9. The processor of claim 1, wherein a given 3D Morton coordinate is to be stored in a 64-bit data element in the source packed data operand, and wherein each 3D coordinate in a given set of three 3D coordinates that is to correspond to the given 3D Morton coordinate is to include from fifteen to twenty-one bits.

10. The processor of claim 1, further comprising:
a branch prediction unit to predict branches;
an instruction prefetch unit coupled with the branch prediction unit, the instruction prefetch unit to prefetch instructions including the 3D Morton coordinate conversion instruction;
a level 1 (L1) instruction cache coupled with the instruction prefetch unit, the L1 instruction cache to store instructions including the 3D Morton coordinate conversion instruction;
an L1 data cache to store data;
a level 2 (L2) cache to store data and instructions including the 3D Morton coordinate conversion instruction;
an instruction fetch unit coupled with the L1 instruction cache and the decode unit to fetch the 32 Morton coordinate conversion instruction from the L1 instruction cache and provide the 3D Morton coordinate conversion instruction to the decode unit; and
a register rename unit coupled with the packed data registers to rename the packed data registers.

11. A method in a processor comprising:
receiving a three-dimensional (3D) Morton coordinate conversion instruction, the 3D Morton coordinate conversion instruction indicating a source packed data operand that includes a plurality of 3D Morton coordinates, and indicating one or more destination storage locations; and
storing one or more result packed data operands in the one or more destination storage locations, the one or more result packed data operands including a plurality of sets of three 3D coordinates, wherein each of the sets of the three 3D coordinates corresponds to a different one of the 3D Morton coordinates.

12. The method of claim 11, further comprising generating each of the sets of the three 3D coordinates by performing a three-way bitwise de-interleave of bits of the corresponding 3D Morton coordinate into three contiguous strings of bits that each correspond to a different one of the three 3D coordinates.

13. The method of claim 11, wherein storing the one or more result packed data operands comprises storing three result packed data operands in three destination storage locations indicated by the 3D Morton coordinate conversion instruction, and wherein 3D coordinates in each of the result packed data operands all correspond to a same dimension.

14. The method of claim 11, wherein storing the one or more result packed data operands comprises storing a single result packed data operand in a single destination storage location indicated by the 3D Morton coordinate conversion instruction, and including storing each set of three 3D coordinates in a different data element of the single result packed data operand in a same relative position as a data element of the source packed data operand having the corresponding 3D Morton coordinate.

15. The method of claim 11, further comprising receiving the source packed data operand having a given 3D Morton coordinate stored in a 32-bit data element, and wherein storing comprises storing a given set of three 3D coordinates that corresponds to the given 3D Morton coordinate in which each 3D coordinate includes from seven to ten bits.

16. The method of claim 11, wherein storing the one or more result packed data operands comprises:
storing at least values of bits at positions 0, 3, 6, 9, 12, 15, and 18 of a given 3D Morton coordinate as a first contiguous string of bits, in the one or more result packed data operands, the first contiguous string of bits to correspond to a first 3D coordinate of a given set of three 3D coordinates that corresponds to the given 3D Morton coordinate;
storing at least values of bits at positions 1, 4, 7, 10, 13, 16, and 19 of the given 3D Morton coordinate as a second contiguous string of bits, in the one or more result packed data operands, the second contiguous string of bits to correspond to a second 3D coordinate of the given set of three 3D coordinates; and
storing at least values of bits at positions 2, 5, 8, 11, 14, 17, and 20 of the given 3D Morton coordinate as a third contiguous string of bits, in the one or more result packed data operands, the third contiguous string of bits to correspond to a third 3D coordinate of the given set of three 3D coordinates.

17. The method of claim 11, further comprising receiving the source packed data operand having a given 3D Morton coordinate stored in a 64-bit data element, and wherein storing comprises storing a given set of three 3D coordinates that corresponds to the given 3D Morton coordinate in which each 3D coordinate includes from fifteen to twenty-one bits.

18. The method of claim 11, wherein storing the one or more result packed data operands comprises:
storing at least values of bits at positions 0, 3, 6, 9, 12, 15, 18, 21, 24, 27, 30, and 33 of a given 3D Morton coordinate as a first contiguous string of bits, in the one or more result packed data operands, the first contiguous string of bits to correspond to a first 3D coordinate of a given set of three 3D coordinates that corresponds to the given 3D Morton coordinate;
storing at least values of bits at positions 1, 4, 7, 10, 13, 16, 19, 22, 25, 28, 31, and 34 of the given 3D Morton coordinate as a second contiguous string of bits, in the one or more result packed data operands, the second contiguous string of bits to correspond to a second 3D coordinate of the given set of three 3D coordinates; and
storing at least values of bits at positions 2, 5, 8, 11, 14, 17, 20, 23, 26, 29, 32, and 35 of the given 3D Morton coordinate as a third contiguous string of bits, in the one or more result packed data operands, the third contiguous string of bits to correspond to a third 3D coordinate of the given set of three 3D coordinates.

19. A system to process instructions comprising:
an interconnect;
a processor coupled with the interconnect, the processor to receive an instruction that is to indicate a source packed data operand that is to include a plurality of data elements, and that is to indicate one or more destination storage locations, the processor, in response to the instruction, to store one or more result packed data operands in the one or more destination storage locations, wherein the one or more result packed data operands are to include a corresponding set of three strings of bits for each data element of the source packed data operand, wherein each set of three strings of bits is to include a first string of bits, a second string of bits, and a third string of bits, wherein each first string of bits is to include at least values of bits at positions 0, 3, 6, 9, 12, 15, and 18 of the corresponding data element of the source packed data operand, wherein each second string of bits is to include at least values of bits at positions 1, 4, 7, 10, 13, 16, and 19 of the corresponding data element of the source packed data operand, and wherein each third string of bits is to include at least values of bits at positions 2, 5, 8, 11, 14, 17, and 20 of the corresponding data element of the source packed data operand; and a dynamic random access memory (DRAM) coupled with the interconnect.

20. The system of claim 19, wherein the processor, in response to the instruction, is to store three result packed data operands in three destination storage locations, wherein one of the three result packed data operands is to store all of the first strings of bits.

21. An article of manufacture comprising a non-transitory machine-readable storage medium, the non-transitory machine-readable storage medium storing an instruction, the instruction to indicate a source packed data operand that is to include a plurality of data elements, and to indicate one or more destination storage locations, and the instruction if executed by a machine is to cause the machine to perform operations comprising to:

store one or more result packed data operands in the one or more destination storage locations, the one or more result packed data operands to include a corresponding set of three strings of bits for each data element of the source packed data operand, wherein each set of three strings of bits is to include a first string of bits, a second string of bits, and a third string of bits, wherein each first string of bits is to include at least values of bits at positions 0, 3, 6, 9, 12, 15, and 18 of the corresponding data element of the source packed data operand, wherein each second string of bits is to include at least values of bits at positions 1, 4, 7, 10, 13, 16, and 19 of the corresponding data element of the source packed data operand, and wherein each third string of bits is to include at least values of bits at positions 2, 5, 8, 11, 14, 17, and 20 of the corresponding data element of the source packed data operand.

22. The article of manufacture of claim 21, wherein the processor, in response to the instruction, is to store a single result packed data operand in a single destination storage location.

23. A processor comprising:
a plurality of packed data registers;
a decode unit to decode an instruction, the instruction to indicate a source packed data operand that is to include a plurality of data elements, and to indicate one or more destination storage locations; and
an execution unit coupled with the packed data registers and coupled with the decode unit, the execution unit, in response to the decode of the instruction, to store one or more result packed data operands in the one or more destination storage locations, wherein the one or more result packed data operands are to include a corresponding set of three strings of bits for each data element of the source packed data operand, wherein each set of three strings of bits is to include a first string of bits, a second string of bits, and a third string of bits, wherein each first string of bits is to include at least values of bits at positions 0, 3, 6, 9, 12, 15, and 18 of the corresponding data element of the source packed data operand, wherein each second string of bits is to include at least values of bits at positions 1, 4, 7, 10, 13, 16, and 19 of the corresponding data element of the source packed data operand, and wherein each third string of bits is to include at least values of bits at positions 2, 5, 8, 11, 14, 17, and 20 of the corresponding data element of the source packed data operand.

24. The processor of claim 23, wherein the execution unit, in response to the decode of the instruction, is to store three result packed data operands in three destination storage locations that are to be indicated by the instruction.

* * * * *

UNITED STATES PATENT AND TRADEMARK OFFICE
CERTIFICATE OF CORRECTION

PATENT NO. : 9,772,848 B2  
APPLICATION NO. : 14/541855  
DATED : September 26, 2017  
INVENTOR(S) : Arnold Kerry Evans et al.

Page 1 of 1

It is certified that error appears in the above-identified patent and that said Letters Patent is hereby corrected as shown below:

In the Claims

In Column 46, Line 3, in Claim 2, delete "dc-interleave" and insert -- de-interleave --, therefor.

In Column 47, Line 33, in Claim 10, delete "32 Morton" and insert -- 3D Morton --, therefor.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*